(12) United States Patent
Hagiwara

(10) Patent No.: US 7,830,612 B2
(45) Date of Patent: Nov. 9, 2010

(54) ZOOM LENS AND IMAGE PICKUP APPARATUS INCLUDING THE SAME

(75) Inventor: Yasuaki Hagiwara, Utsunomiya (JP)

(73) Assignee: Canon Kanushiki Kaisha, Tokyo (JP)

( * ) Notice: Subject to any disclaimer, the term of this patent is extended or adjusted under 35 U.S.C. 154(b) by 0 days.

(21) Appl. No.: 12/469,426

(22) Filed: May 20, 2009

(65) Prior Publication Data
US 2009/0290232 A1 Nov. 26, 2009

(30) Foreign Application Priority Data
May 23, 2008 (JP) .............................. 2008-135687

(51) Int. Cl.
G02B 15/14 (2006.01)
(52) U.S. Cl. ....................... 359/676; 359/683; 359/684; 359/685; 359/686; 359/714; 359/740; 359/766
(58) Field of Classification Search ................. 359/676, 359/683–686, 714, 740, 763, 766
See application file for complete search history.

(56) References Cited

U.S. PATENT DOCUMENTS 6,025,962 A * 2/2000 Suzuki ....................... 359/766
7,177,092 B2 2/2007 Satori
7,280,286 B2 * 10/2007 Hayakawa ................... 359/686
7,428,107 B2 * 9/2008 Nishimura ................... 359/683
7,450,314 B2 * 11/2008 Satori et al. .................. 359/683

FOREIGN PATENT DOCUMENTS

| JP | 2003-255228 | 9/2003 |
|----|-------------|--------|
| JP | 2007-47538  | 2/2007 |

* cited by examiner

Primary Examiner—Evelyn A. Lester
(74) Attorney, Agent, or Firm—Canon U.S.A., Inc., IP Division

(57) ABSTRACT

A zoom lens includes a first lens unit having a positive refractive power, a second lens unit having a negative refractive power, a third lens unit having a positive refractive power, a fourth lens unit having a negative refractive power, and a fifth lens unit having a positive refractive power. The first to fifth lens units are arranged in order from the object side to the image side. All of the lens units are moved during zooming from the wide-angle end to the telephoto end such that the distance between the first lens unit and the second lens unit is increased and the distance between the third lens unit and the fifth lens unit is increased. The refractive power of the fourth lens unit and the refractive power of the fifth lens unit are adequately set with respect to the zoom ratio.

16 Claims, 29 Drawing Sheets

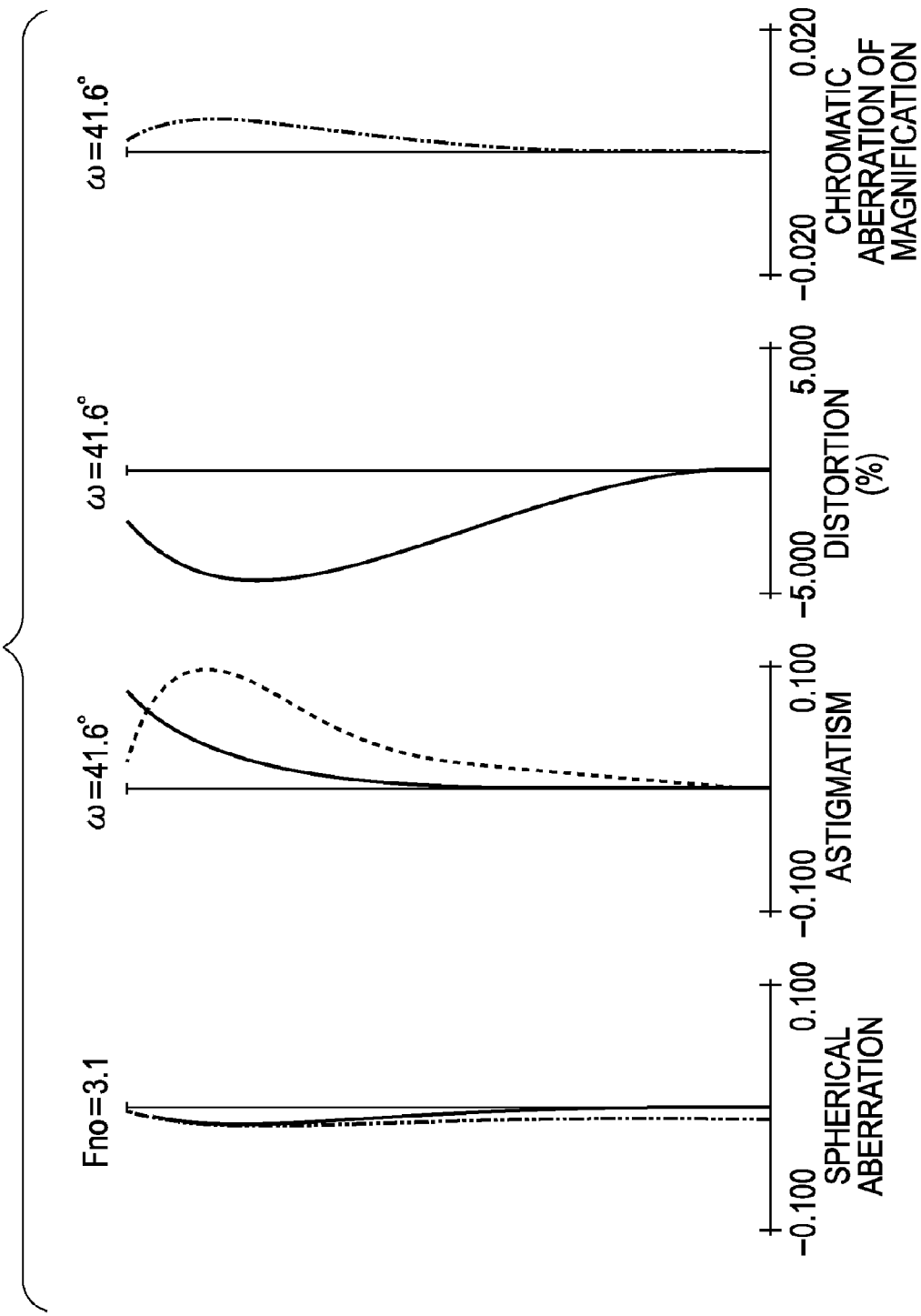

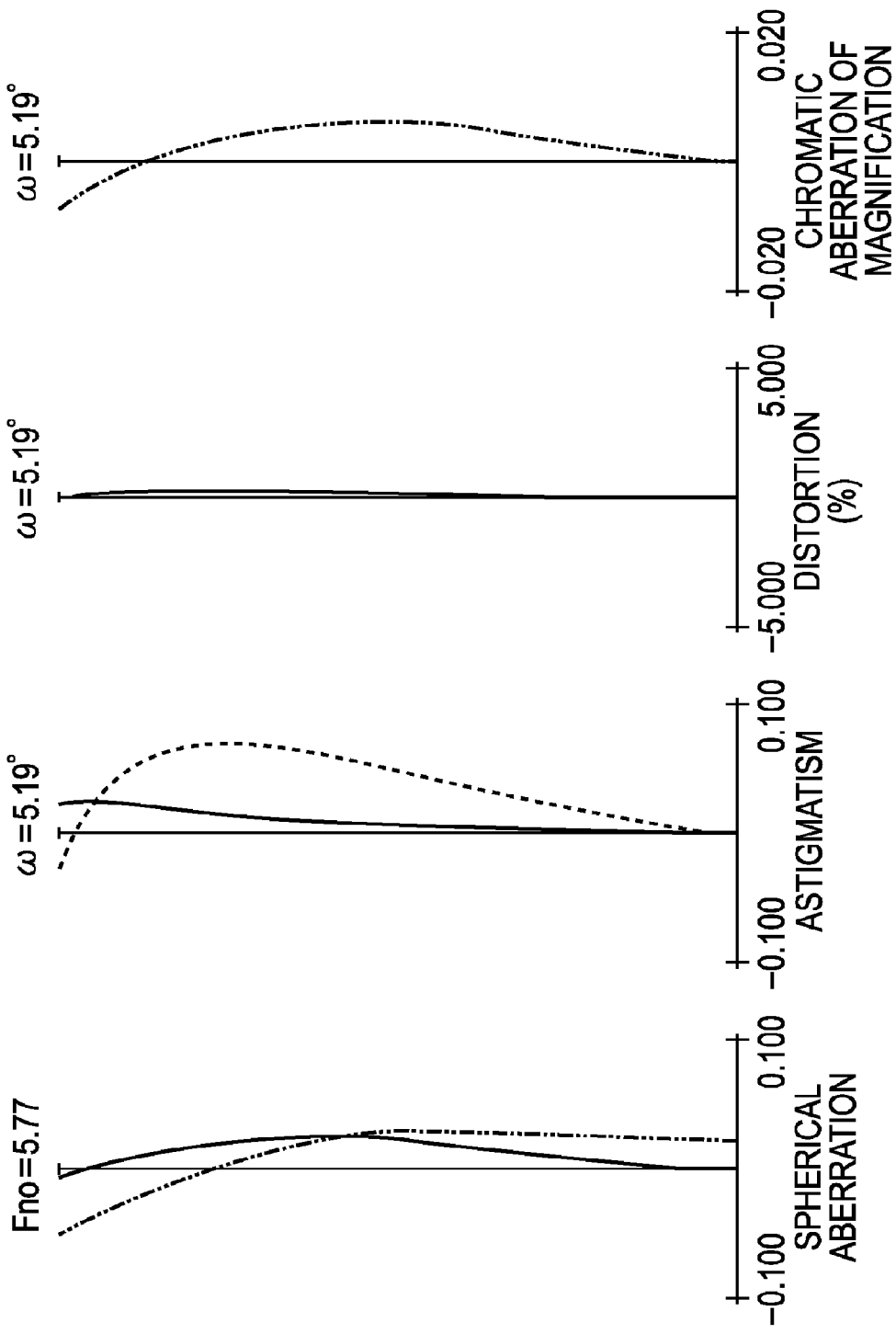

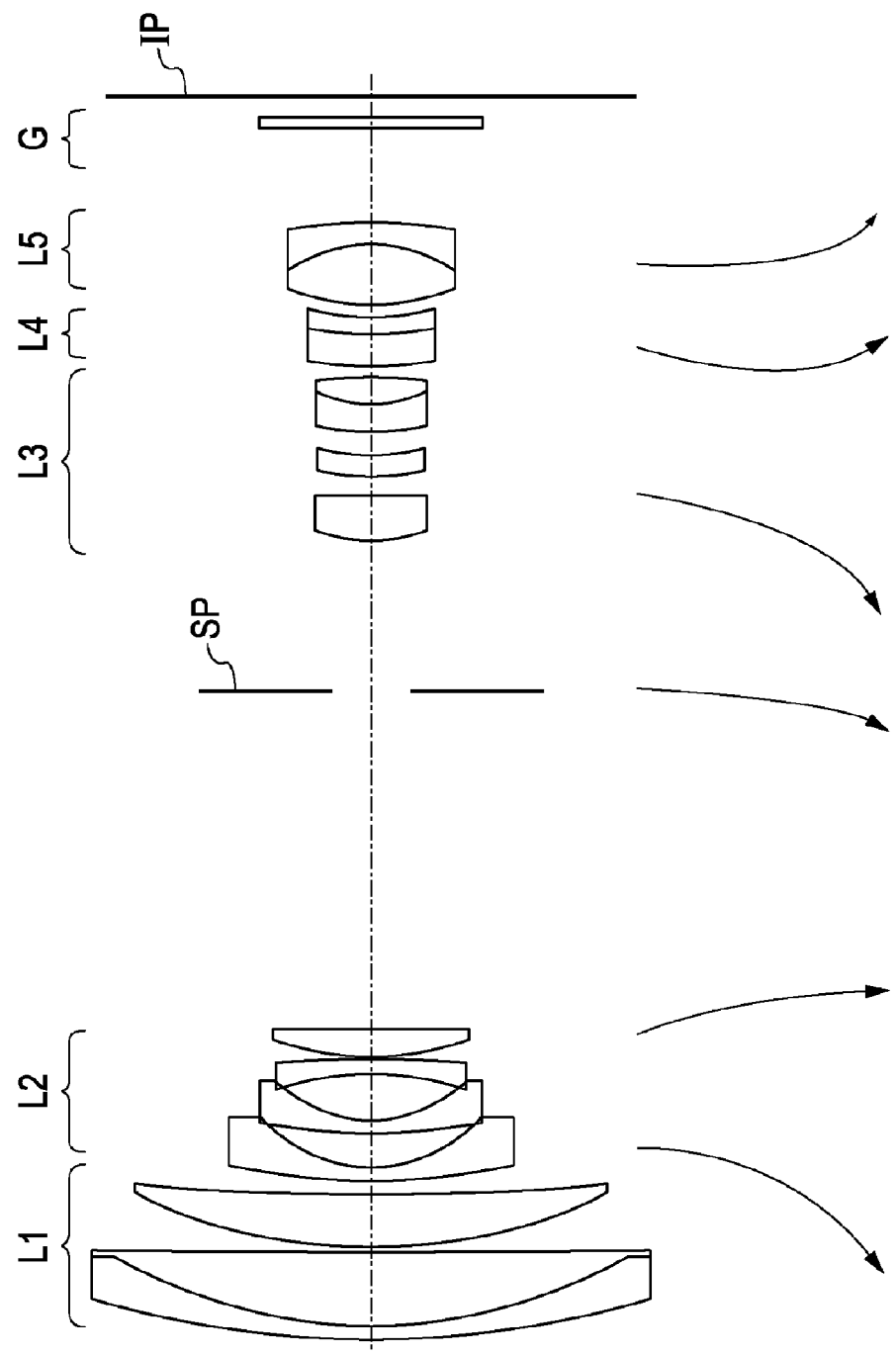

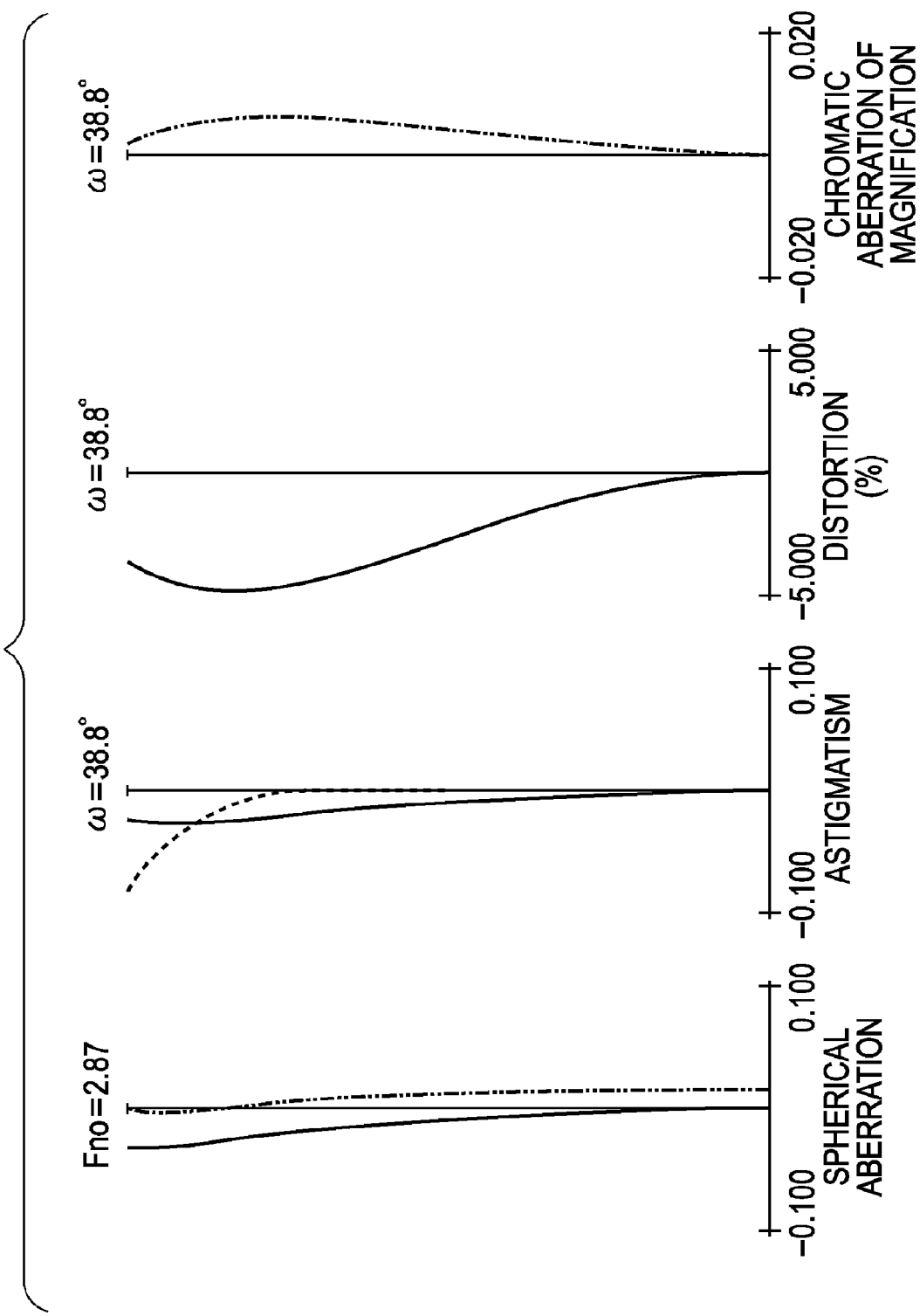

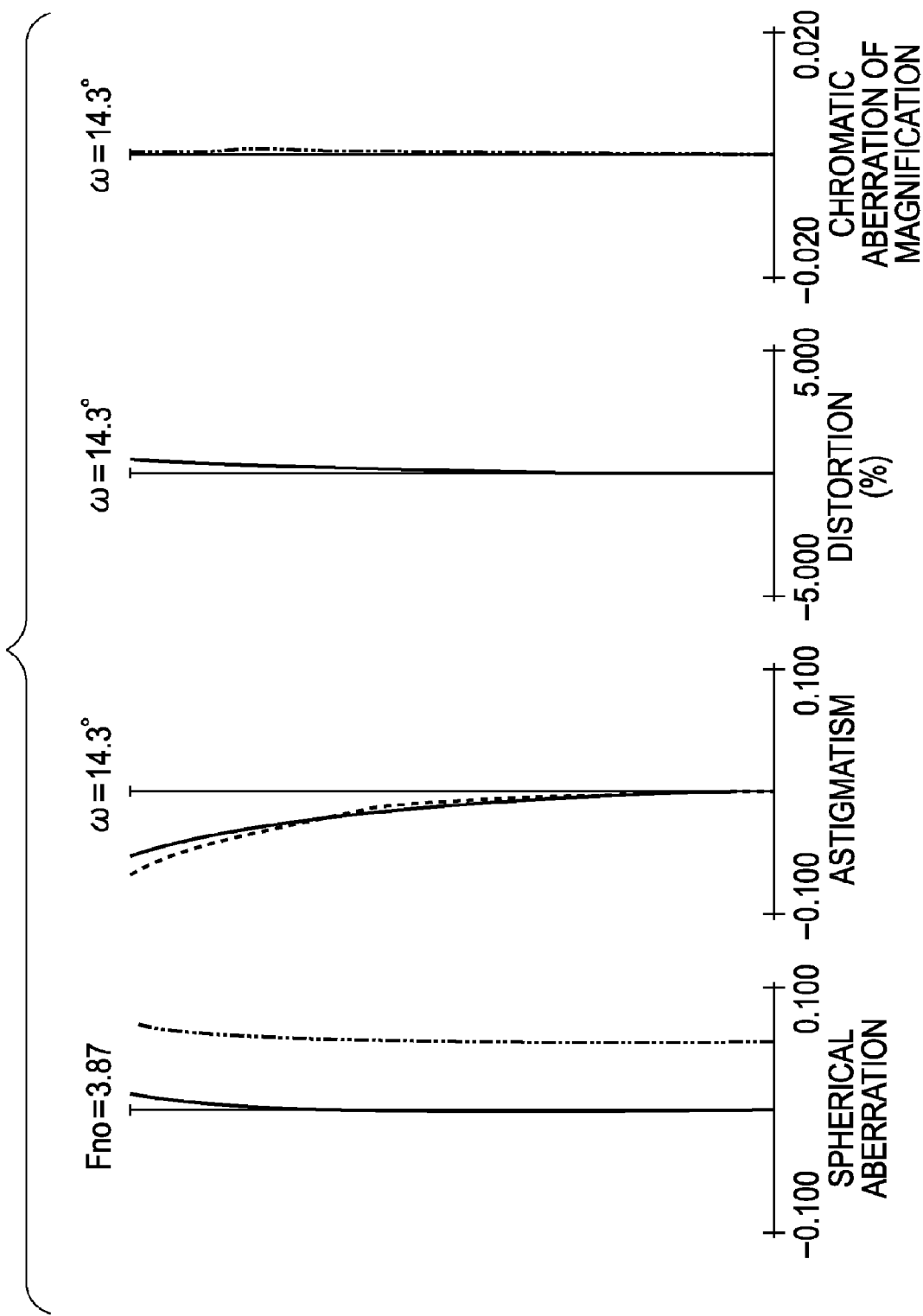

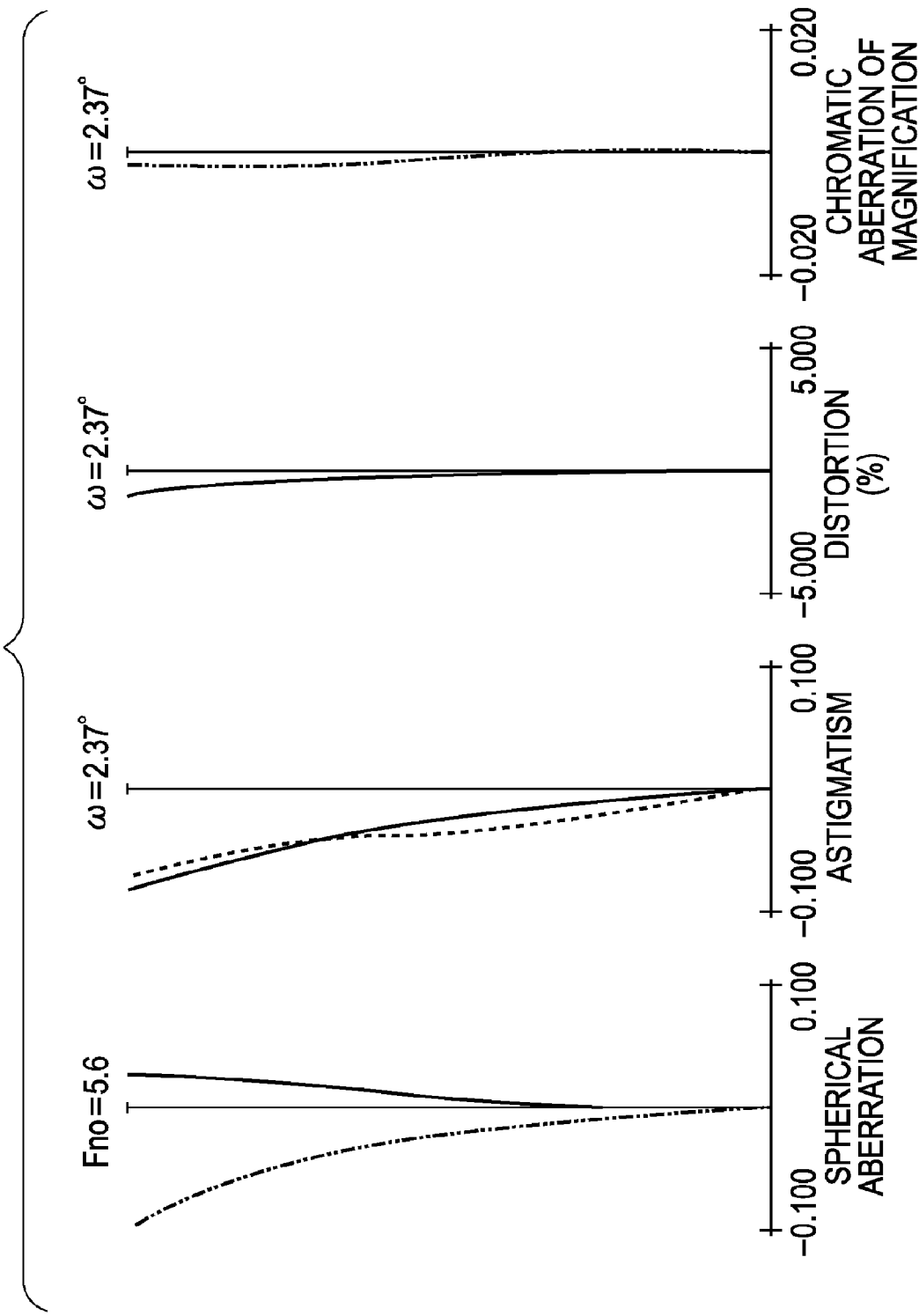

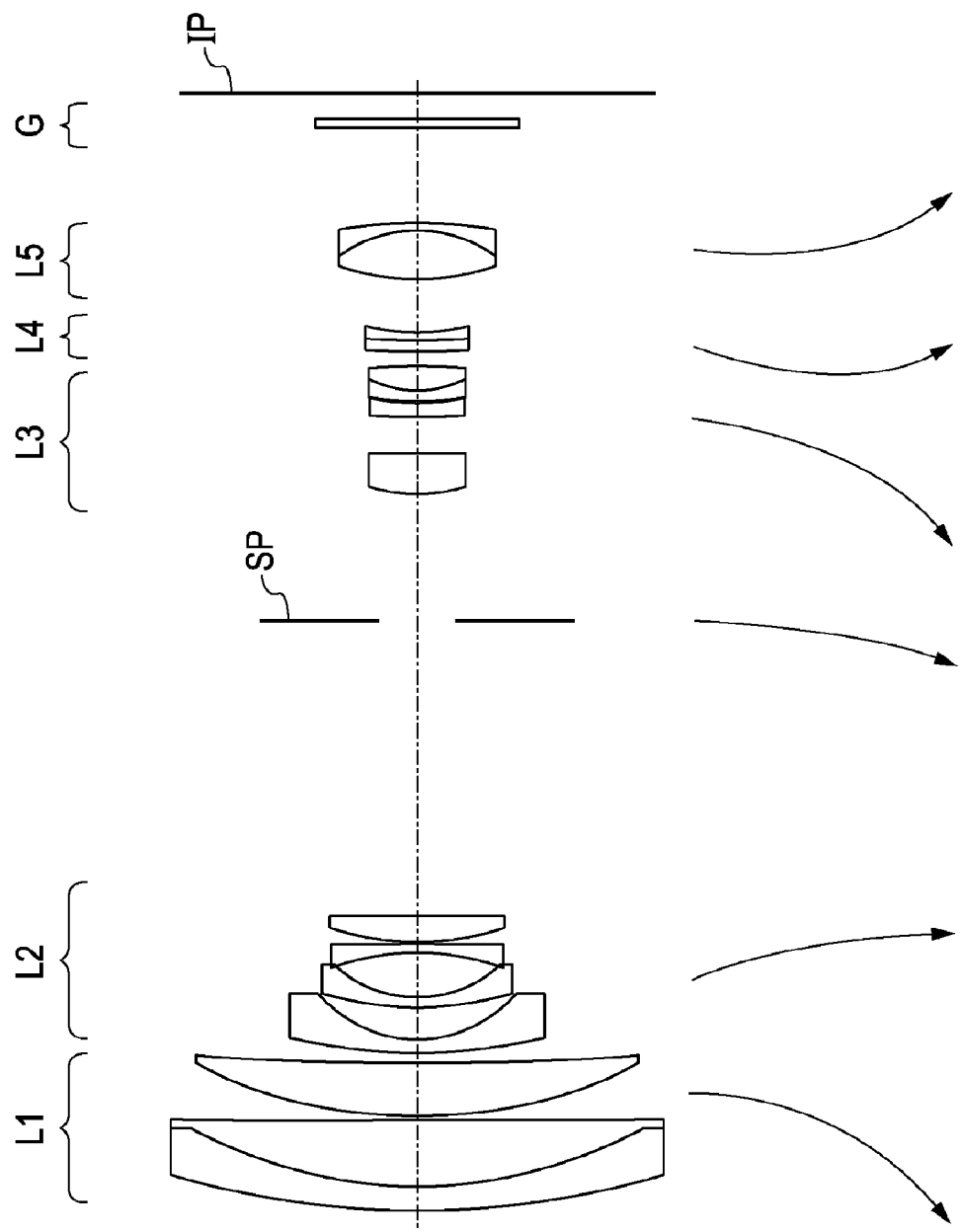

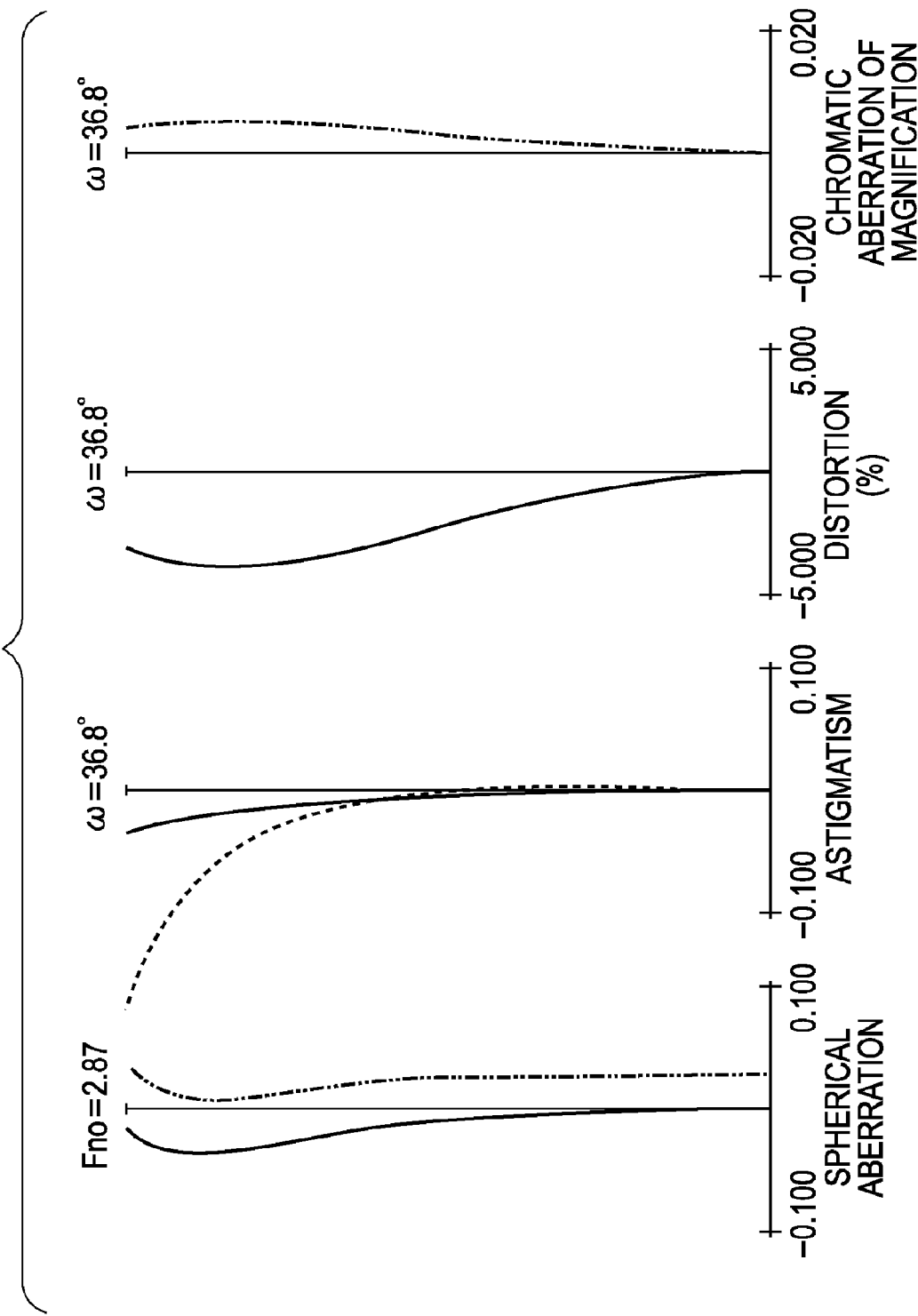

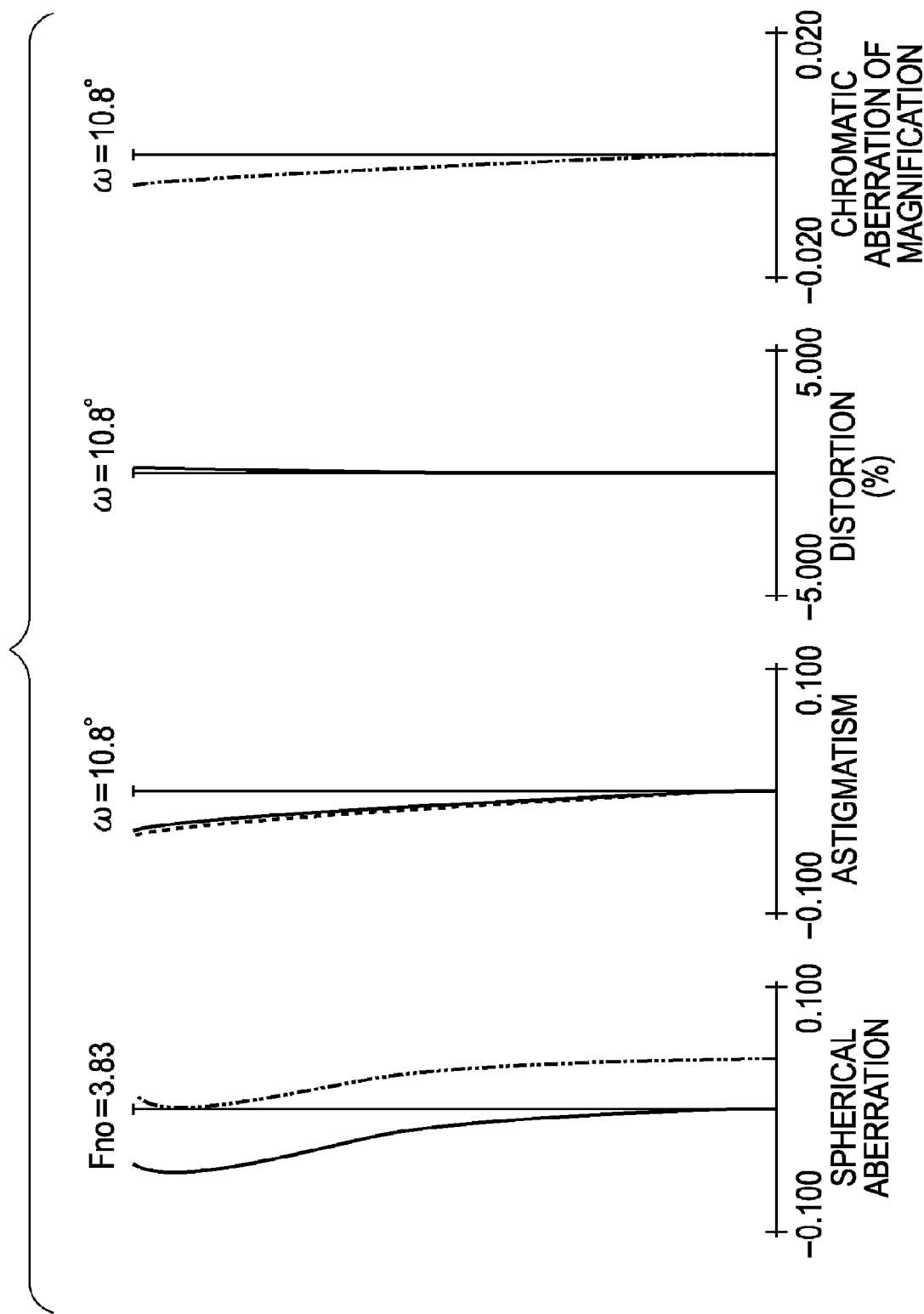

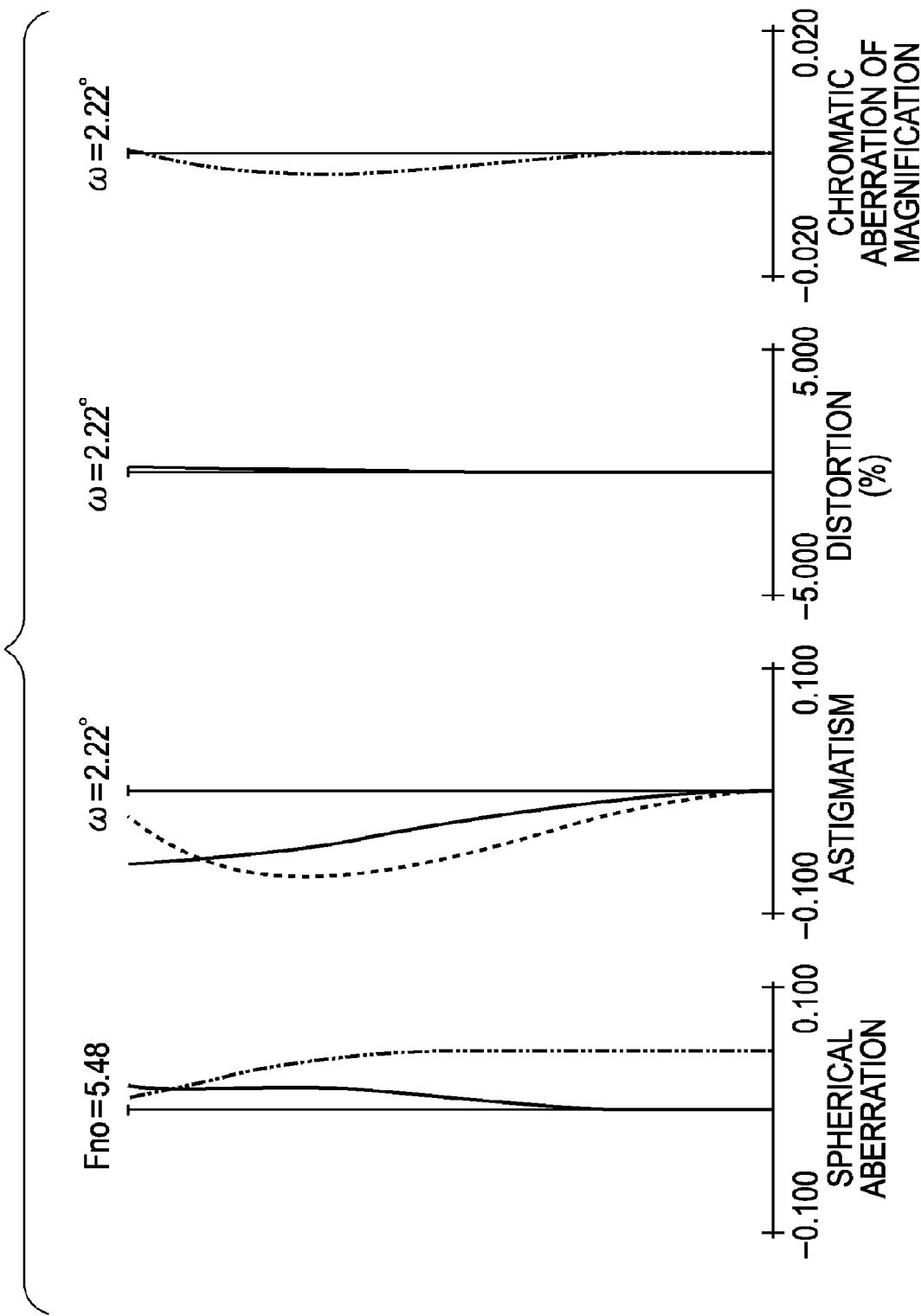

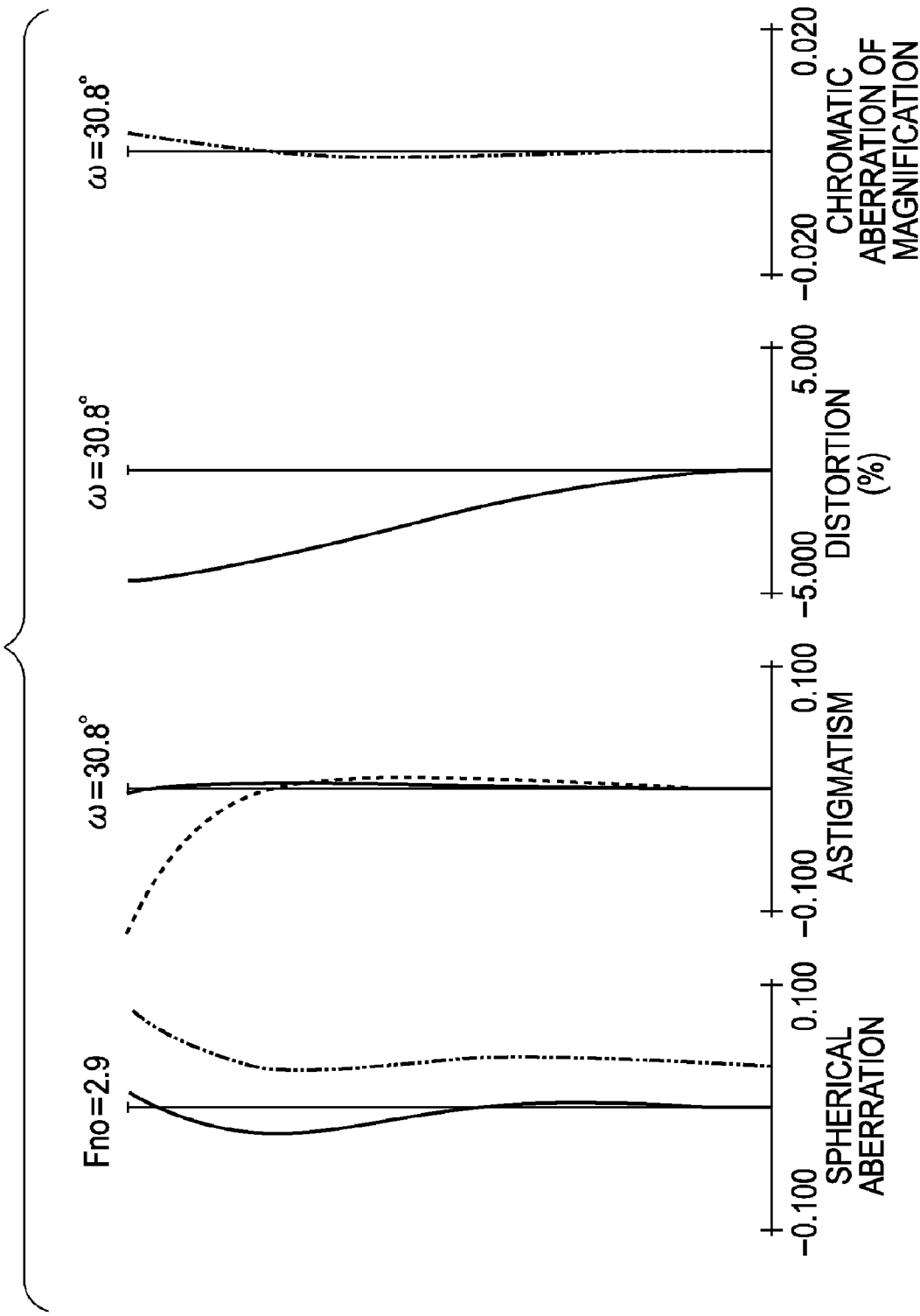

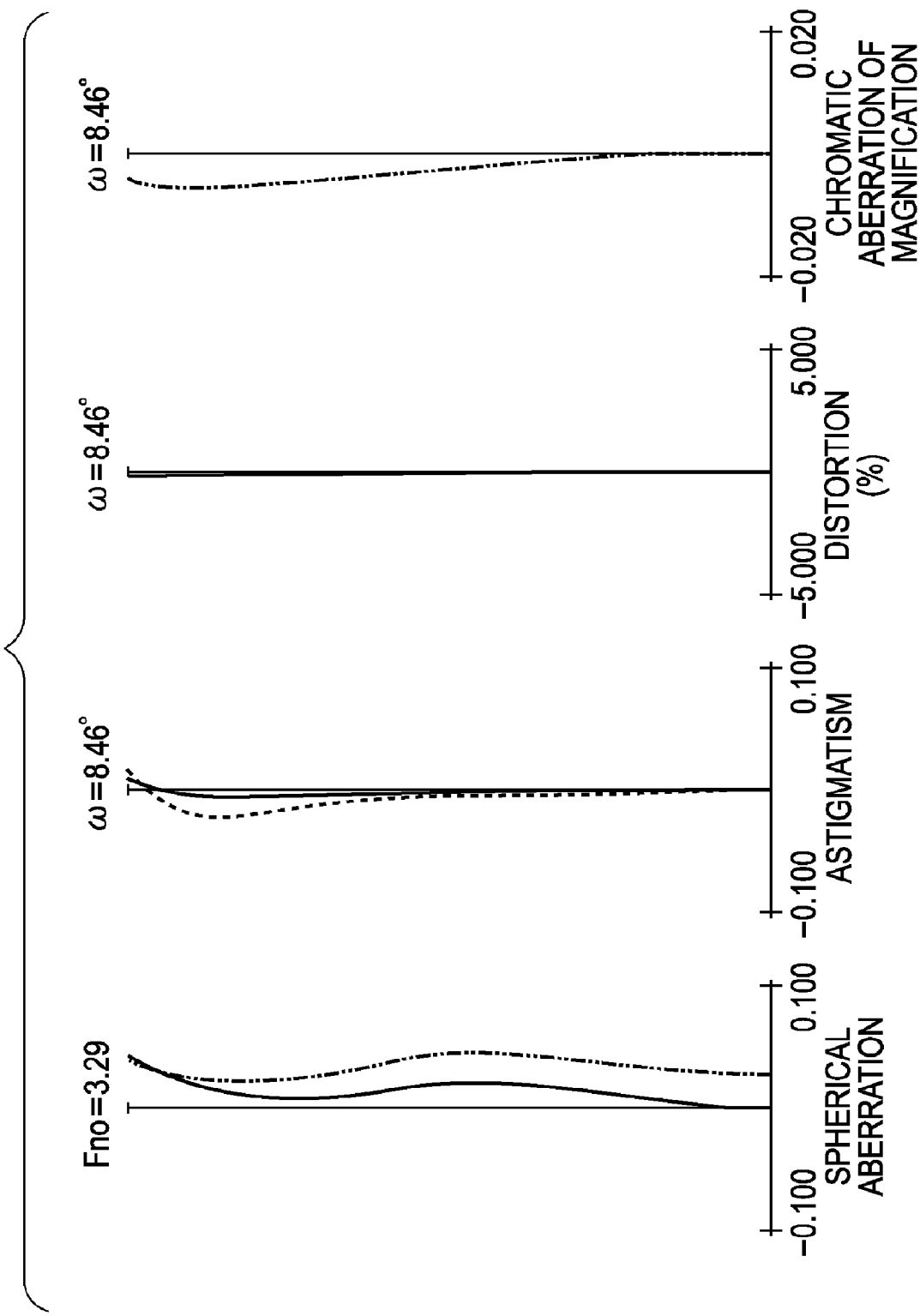

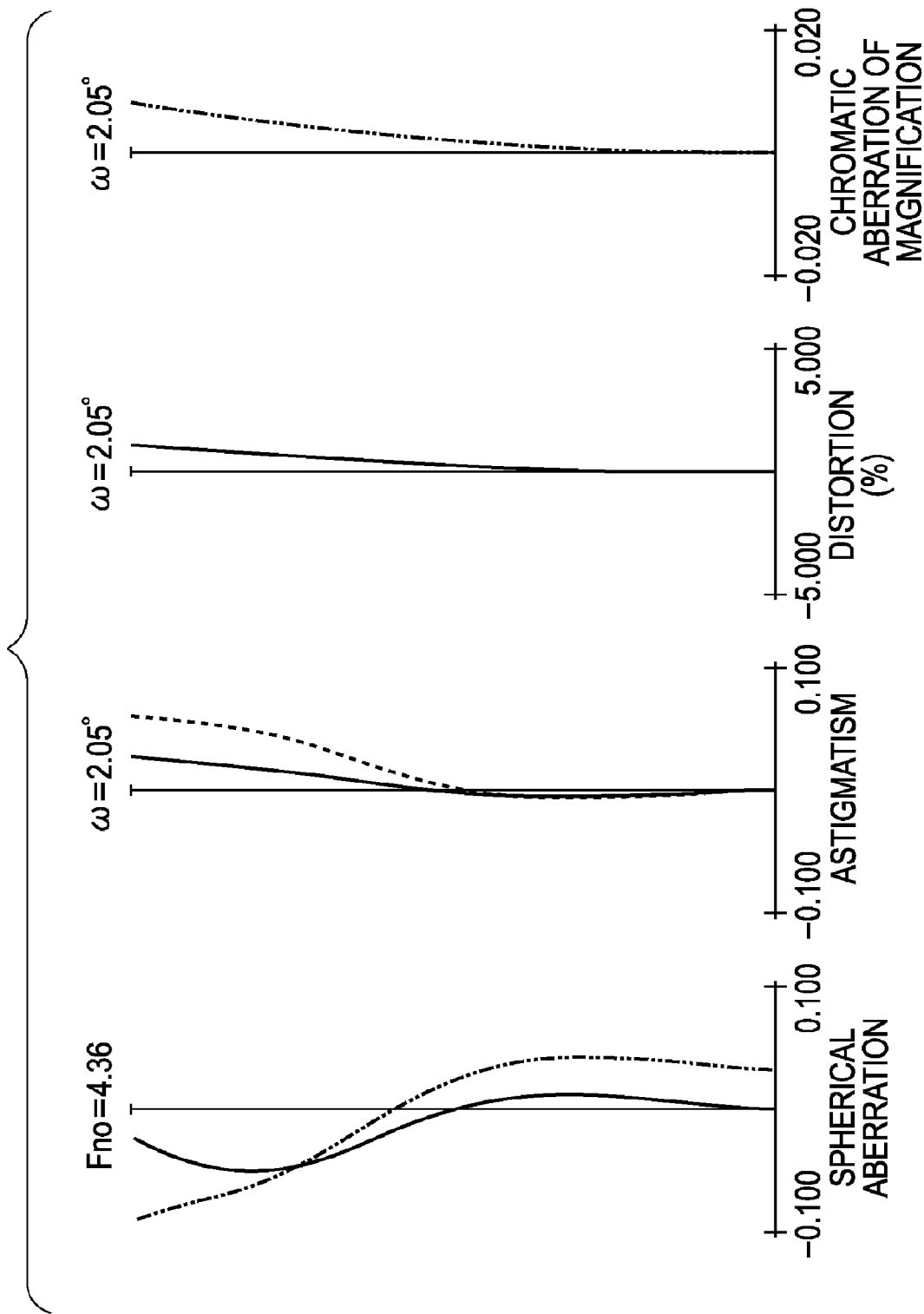

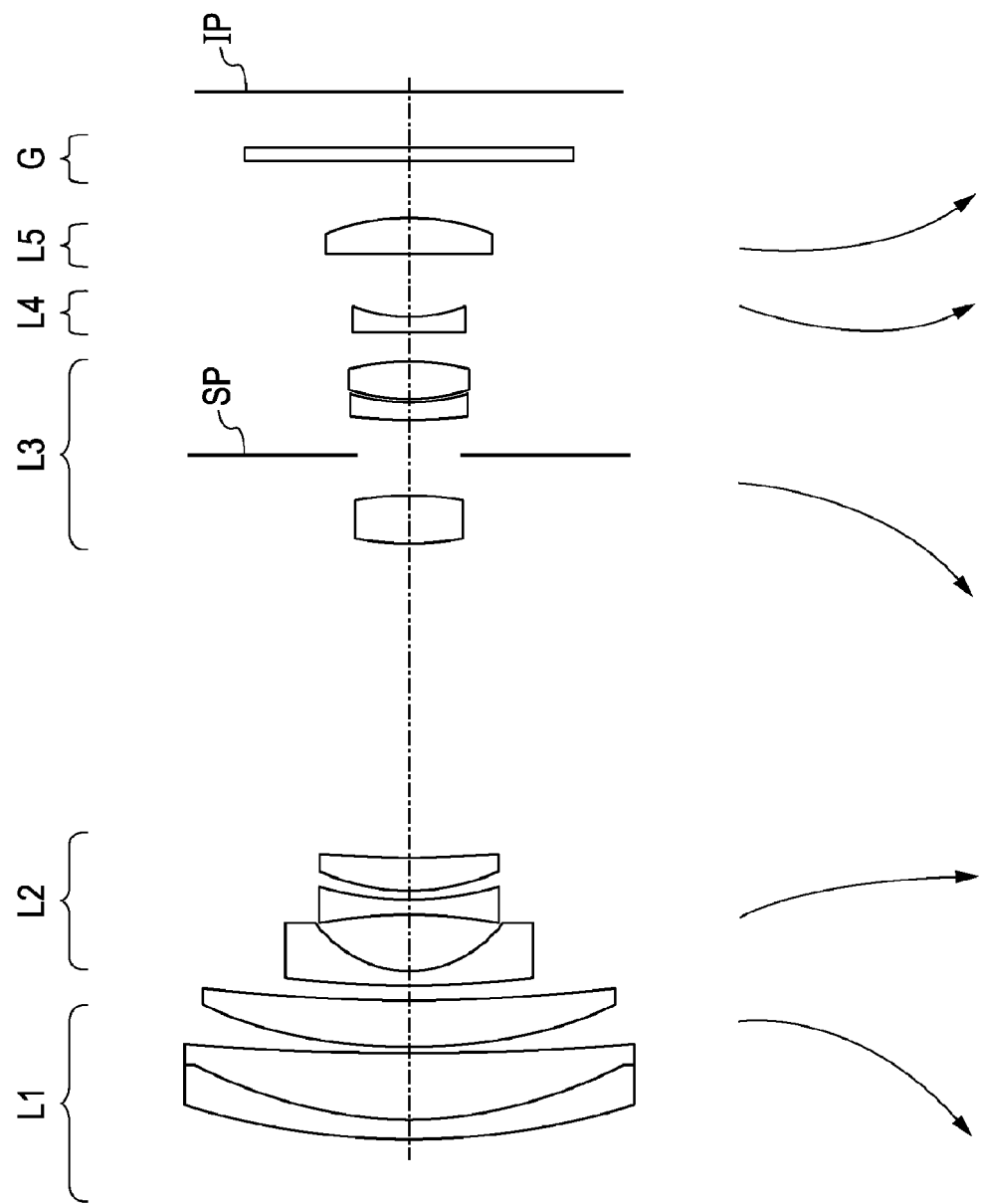

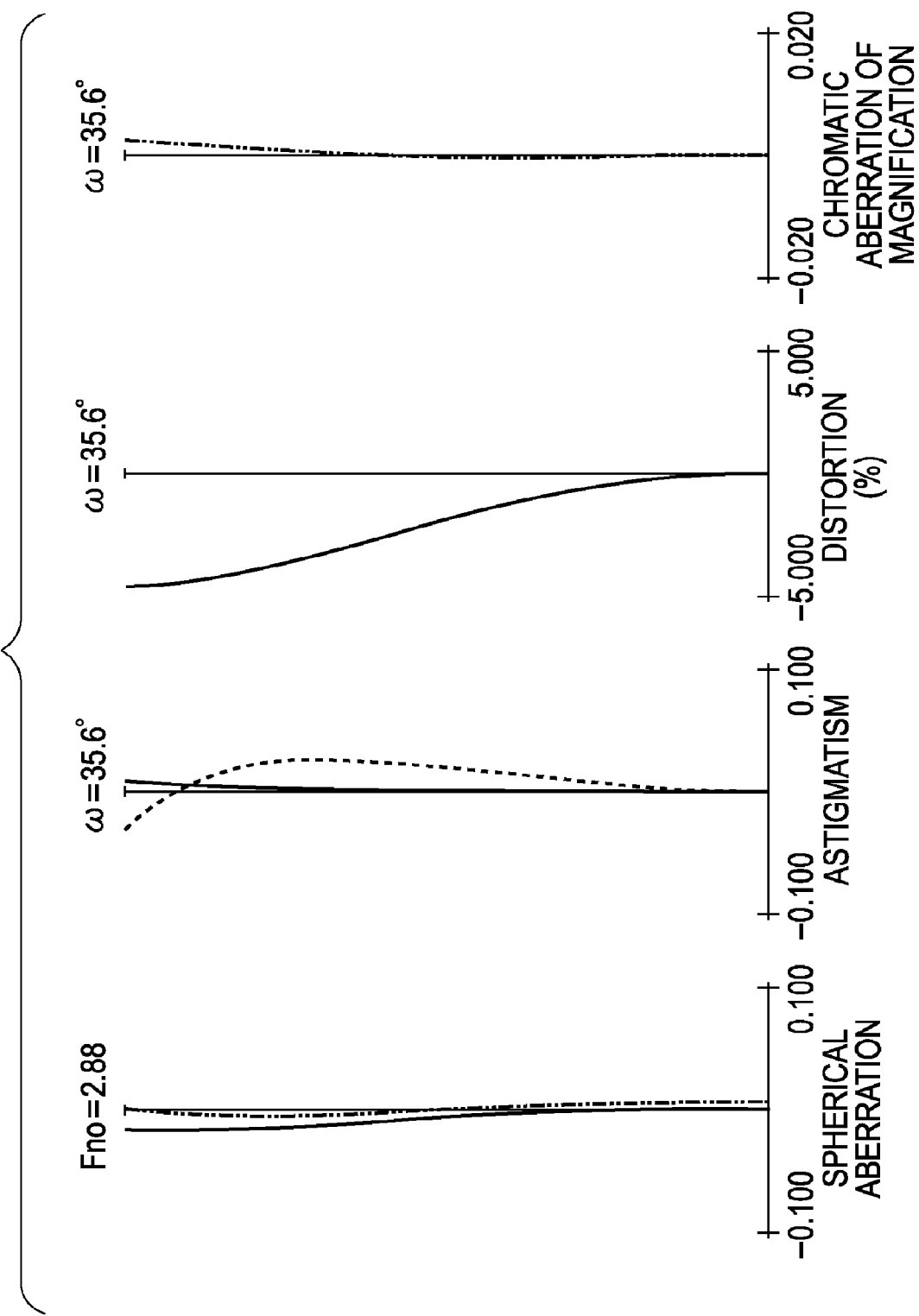

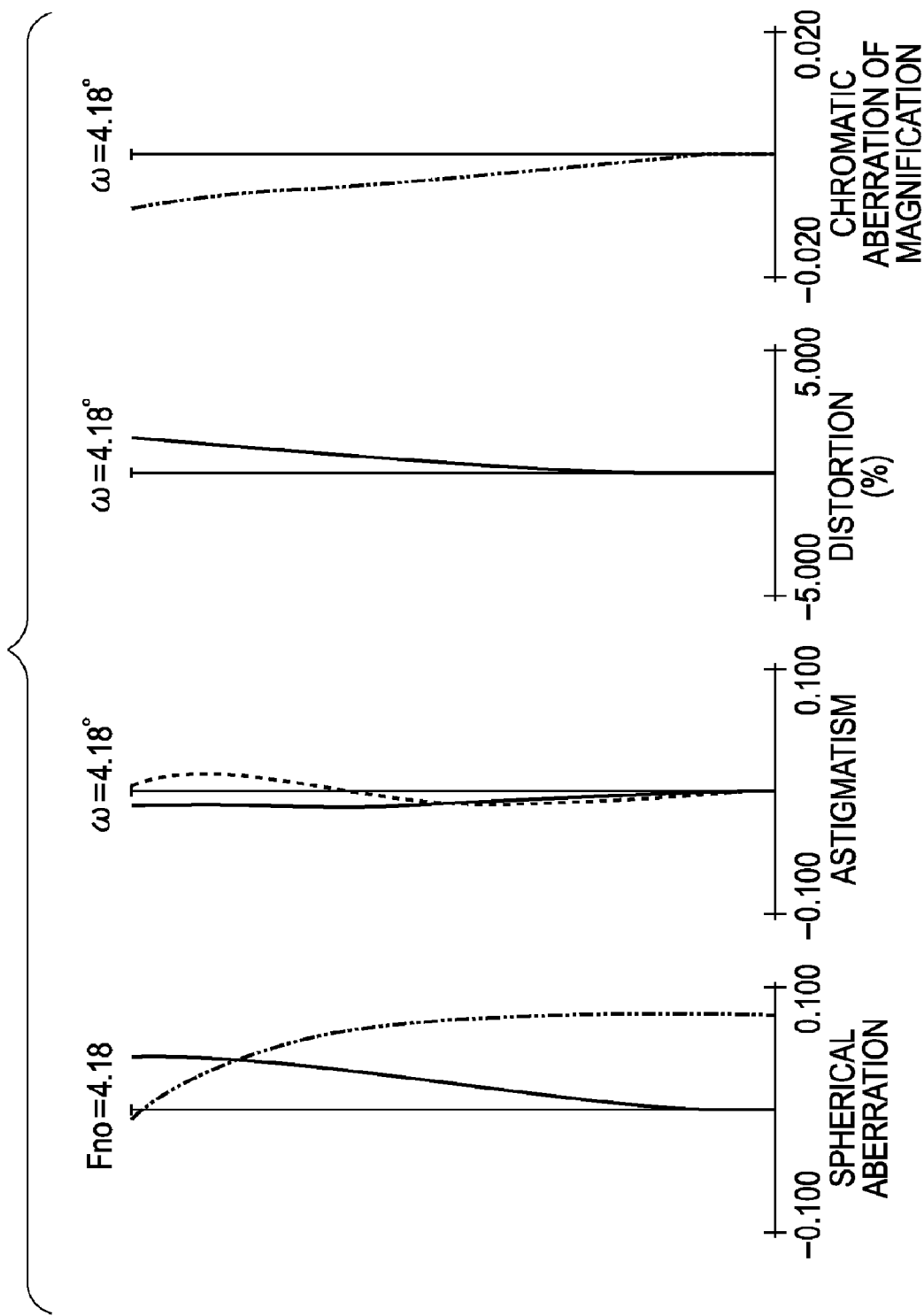

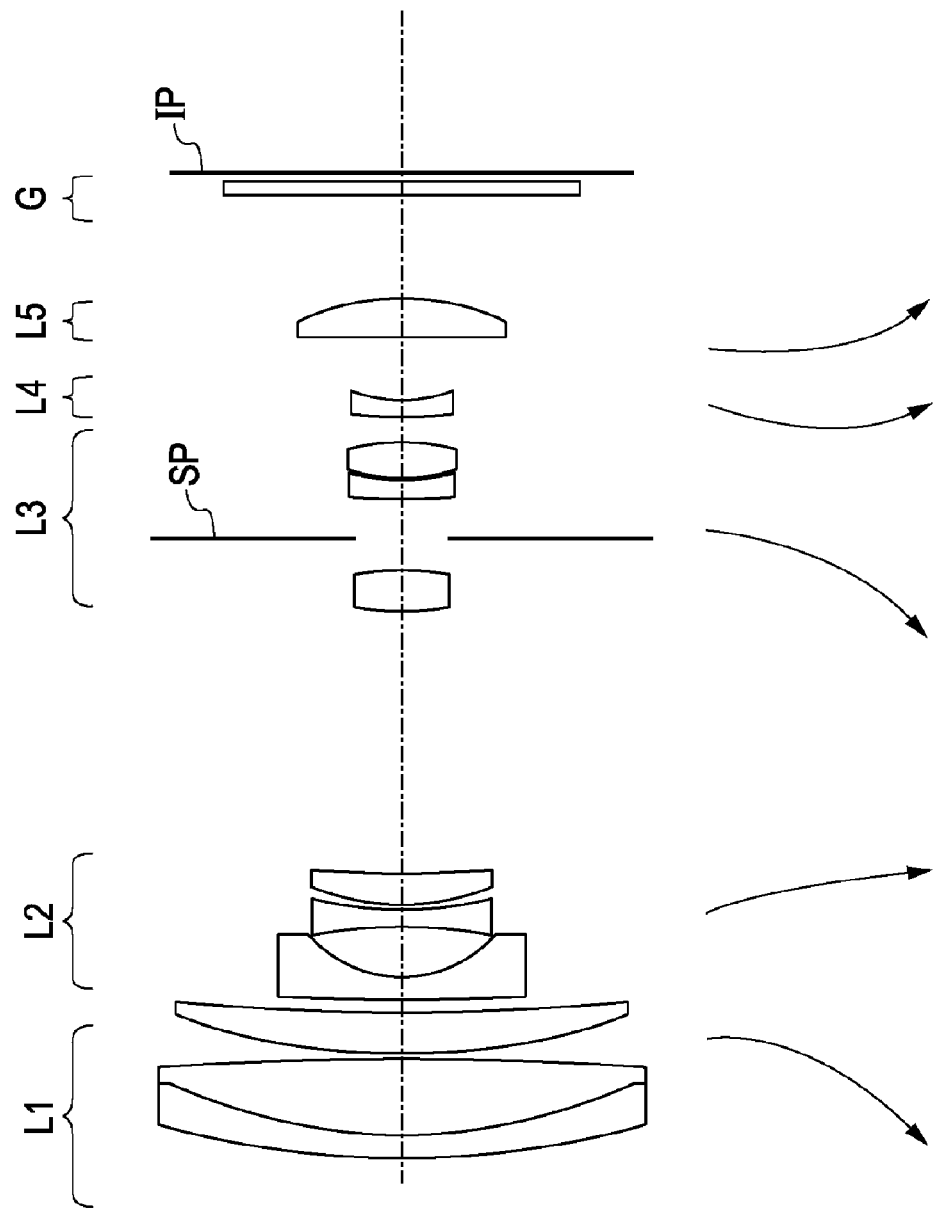

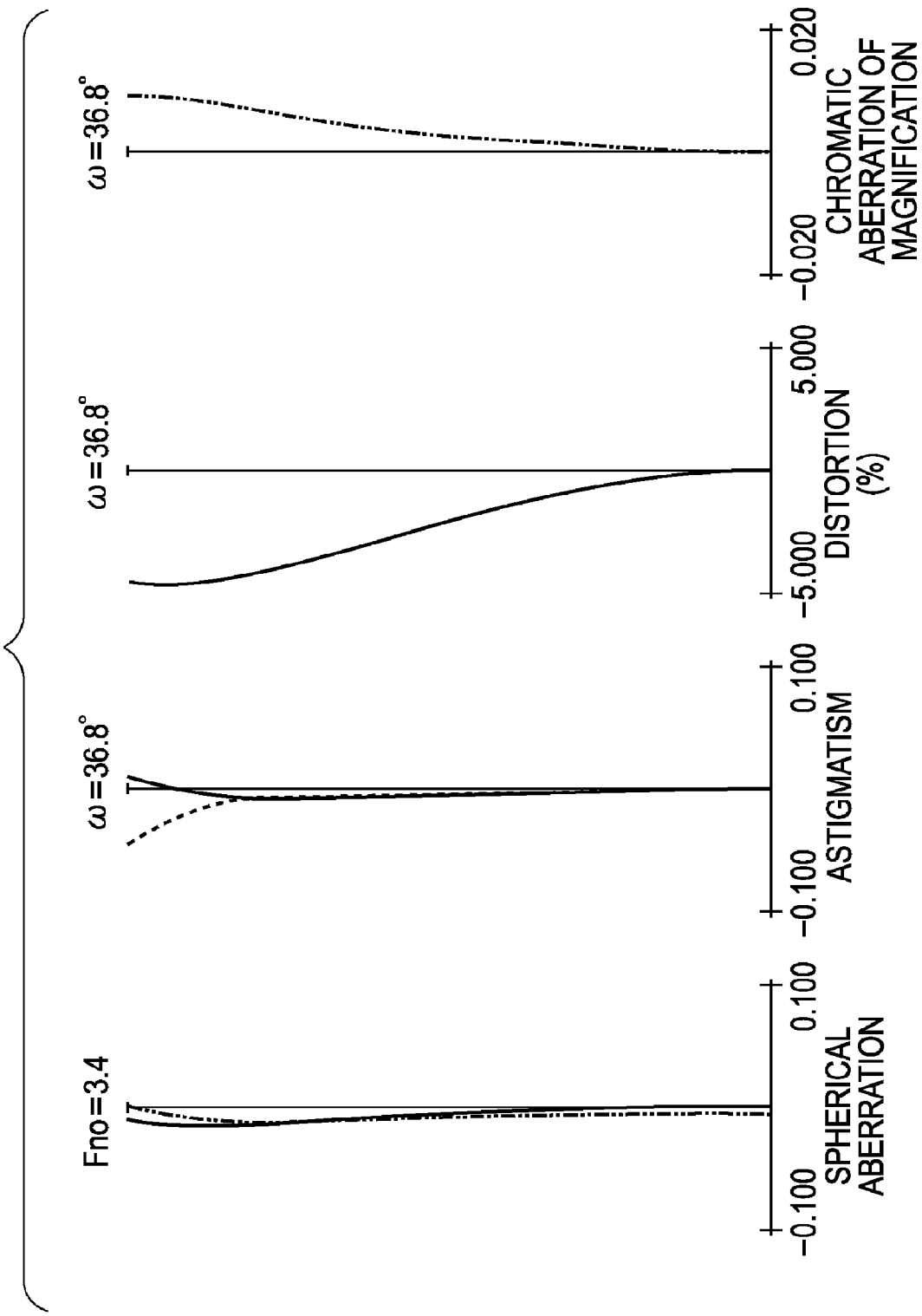

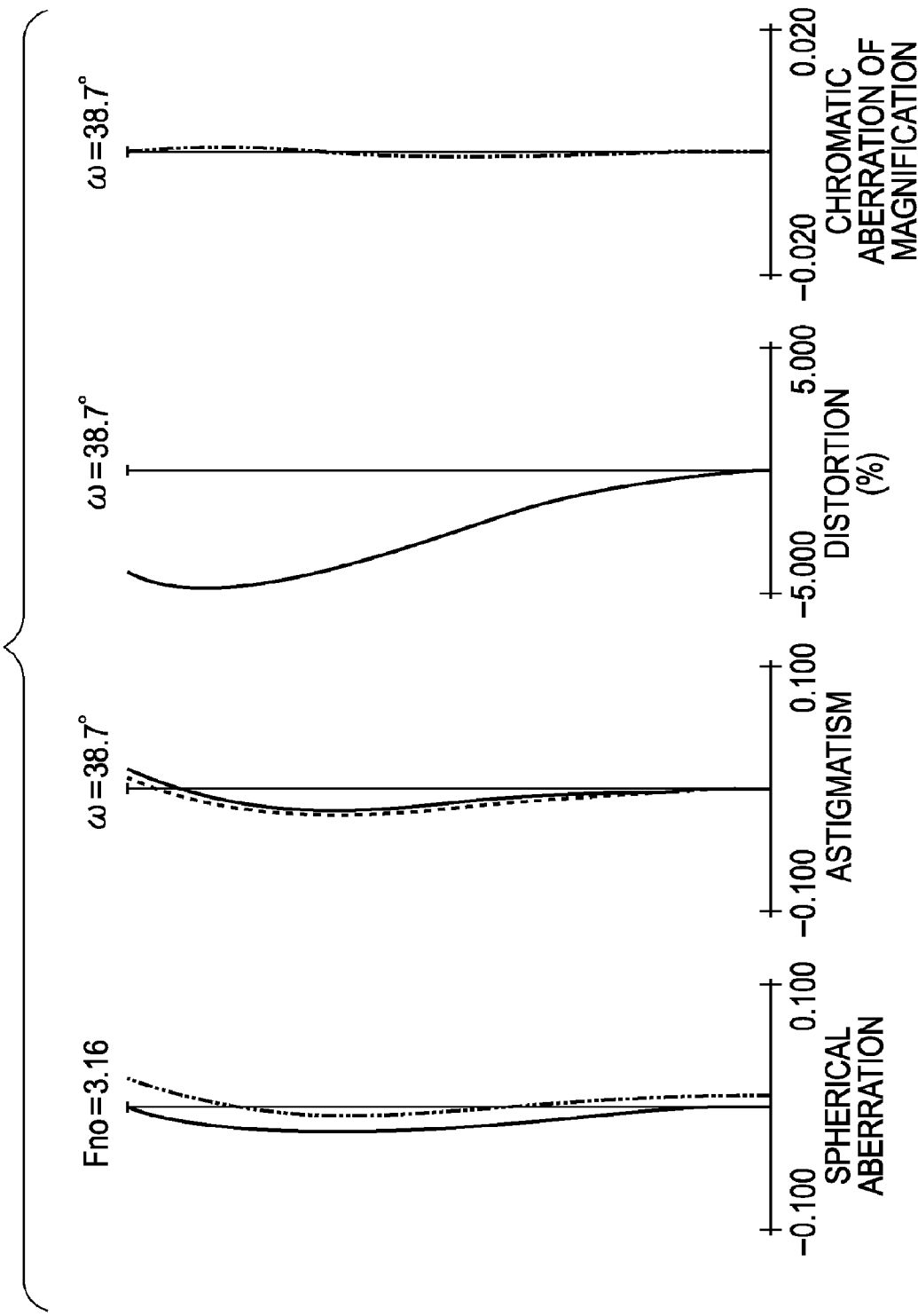

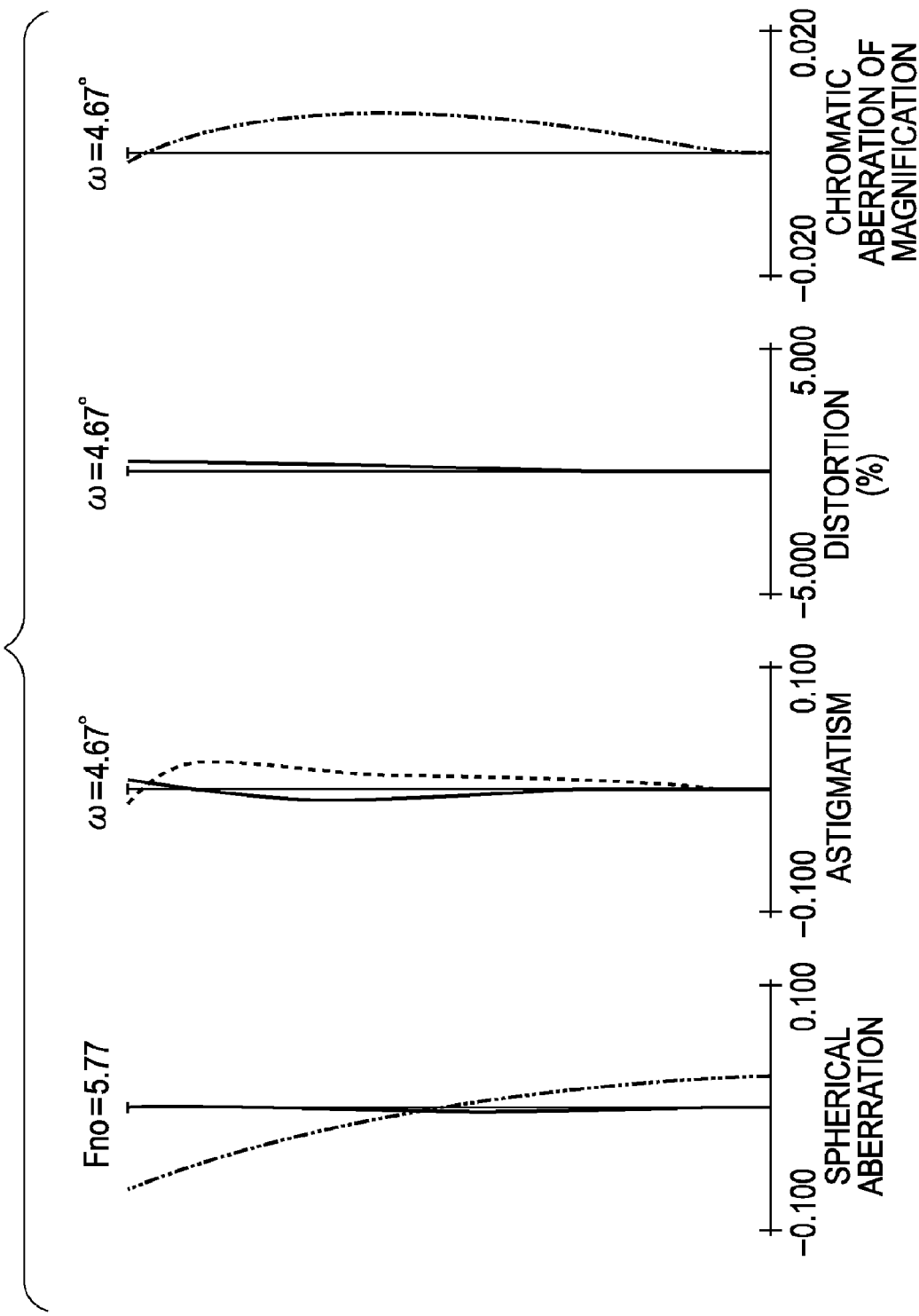

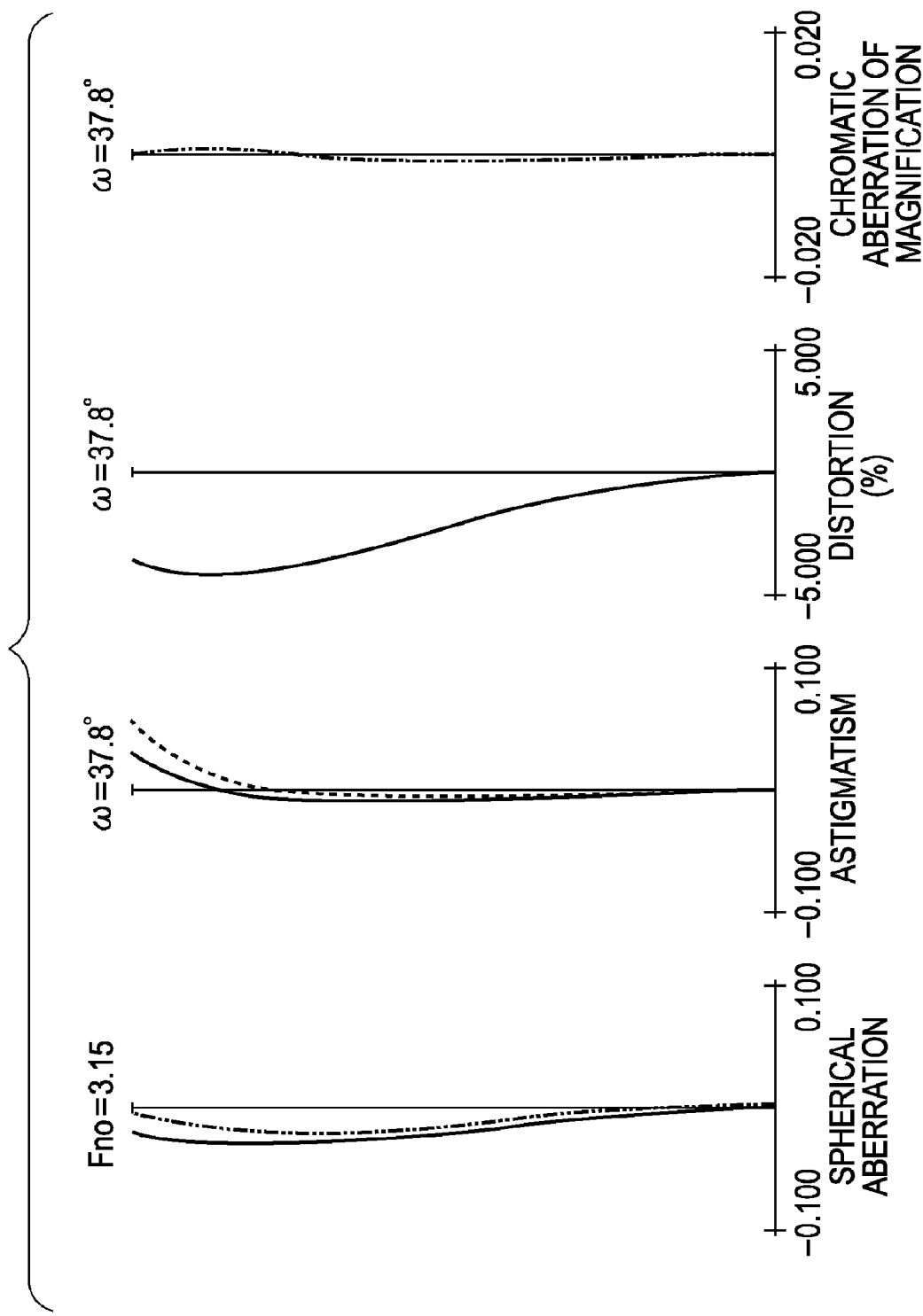

ZOOM LENS AND IMAGE PICKUP APPARATUS INCLUDING THE SAME

BACKGROUND OF THE INVENTION

1. Field of the Invention

The present invention relates to zoom lenses and image pickup apparatuses including the zoom lenses, and more particularly, to a zoom lens suitable for use in a still camera, a video camera, a digital still camera, a surveillance camera, etc., and an image pickup apparatus including the zoom lens.

2. Description of the Related Art

Recently, digital still cameras and digital video cameras including a solid-state image pickup element, such as a CCD and a CMOS device, have been commonly used. The number of pixels included in the solid-state image pickup element has been increased and, accordingly, small, high-magnification optical systems having high optical performance have come into widespread use.

For example, U.S. Pat. No. 7,177,092 discusses a wide-field-angle zoom lens having a high zoom ratio (about 10) from a wide-angle range to a telephoto range.

In addition, Japanese Patent Laid-Open No. 2007-47538 discusses a small zoom lens having a high zoom ratio (about 10) from a wide-angle range to a telephoto range.

In the zoom lens according to U.S. Pat. No. 7,177,092, the field angle 2ω at the wide angle end is 76° and the zoom ratio is about 10. Thus, a large field angle and a high zoom ratio are obtained. However, the overall lens length at the telephoto end is relatively large.

According to Japanese Patent Laid-Open No. 2007-47538, a small zoom lens with a high zoom ratio of about 10 is provided. However, a large image-plane variation occurs in a meridional cross section during zooming from the wide-angle end to the telephoto end.

SUMMARY OF THE INVENTION

The present invention provides a small, high-zoom-ratio zoom lens having high optical performance and a large field angle at the wide-angle end, and an image pickup apparatus including the zoom lens.

According to an aspect of the present invention, a zoom lens includes a first lens unit having a positive refractive power, a second lens unit having a negative refractive power, a third lens unit having a positive refractive power, a fourth lens unit having a negative refractive power, and a fifth lens unit having a positive refractive power. The first lens unit, the second lens unit, the third lens unit, the fourth lens unit, and the fifth lens unit are arranged in order from the object side to the image side. All of the lens units are moved during zooming from the wide-angle end to the telephoto end such that a distance between the first lens unit and the second lens unit is increased and a distance between the third lens unit and the fifth lens unit is increased. The following condition is satisfied:

$$0.01 \leq (|f4|/f5)/Z \leq 0.11$$

$$Z = ft/fw$$

where f4 is a focal length of the fourth lens unit, f5 is a focal length of the fifth lens unit, fw is a focal length of the entire system of the zoom lens at the wide-angle end, and ft is a focal length of the entire system of the zoom lens at the telephoto end.

Further features of the present invention will become apparent from the following description of exemplary embodiments with reference to the attached drawings.

BRIEF DESCRIPTION OF THE DRAWINGS

FIGS. 2A to 2C illustrate aberration diagrams of the zoom lens according to the first numerical example of the present invention.

FIG. 3 is a sectional view of a zoom lens according to a second numerical example of the present invention at the wide-angle end.

FIGS. 4A to 4C illustrate aberration diagrams of the zoom lens according to the second numerical example of the present invention.

FIG. 5 is a sectional view of a zoom lens according to a third numerical example of the present invention at the wide-angle end.

FIGS. 6A to 6C illustrate aberration diagrams of the zoom lens according to the third numerical example of the present invention.

FIGS. 8A to 8C illustrate aberration diagrams of the zoom lens according to the fourth numerical example of the present invention.

FIG. 9 is a sectional view of a zoom lens according to a fifth numerical example of the present invention at the wide-angle end.

FIGS. 10A to 10C illustrate aberration diagrams of the zoom lens according to the fifth numerical example of the present invention.

FIG. 11 is a sectional view of a zoom lens according to a sixth numerical example of the present invention at the wide-angle end.

FIGS. 12A to 12C illustrate aberration diagrams of the zoom lens according to the sixth numerical example of the present invention.

FIGS. 14A to 14C illustrate aberration diagrams of the zoom lens according to the seventh numerical example of the present invention.

DESCRIPTION OF THE EMBODIMENTS

Figure 1:
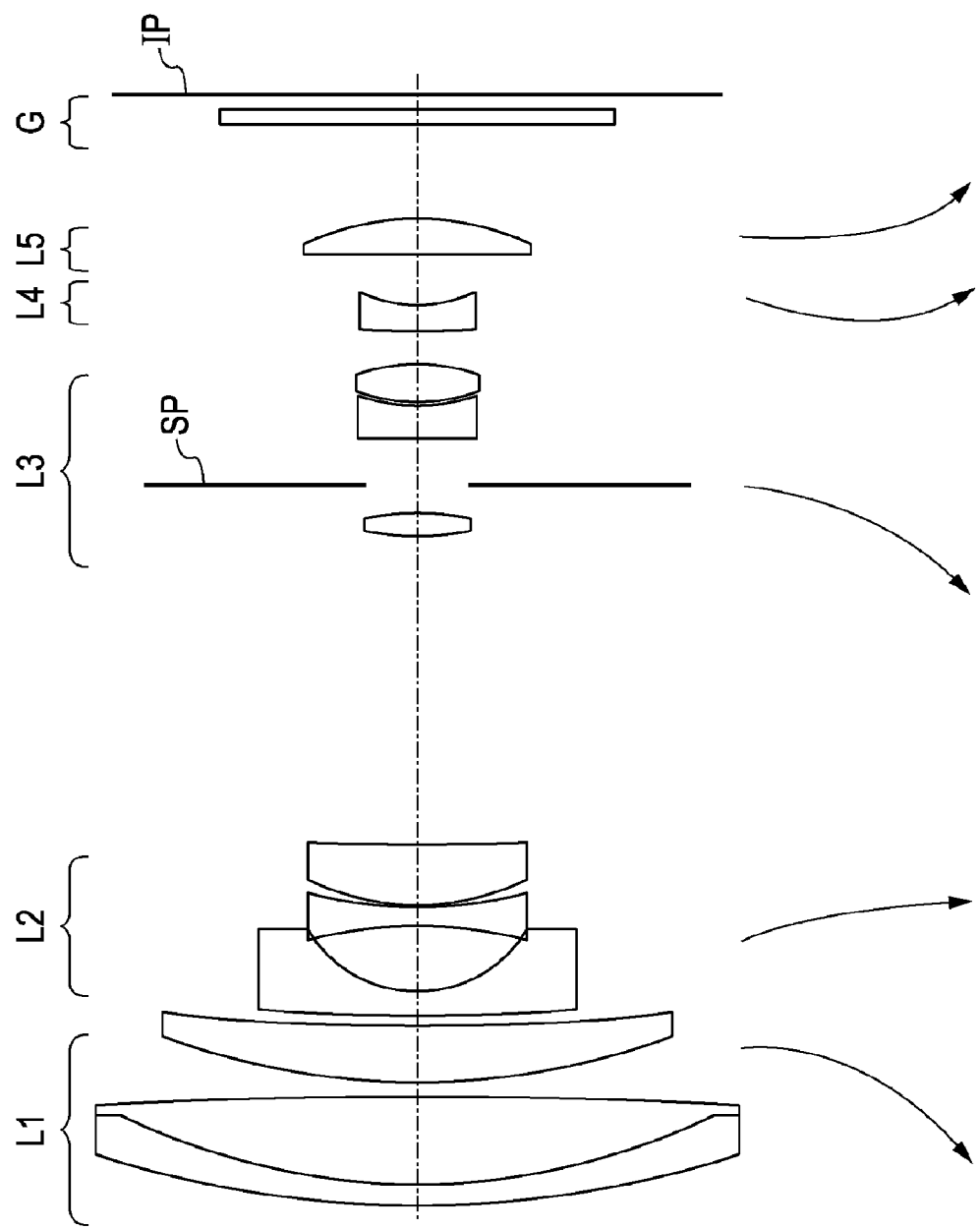
FIG. 1 is a sectional view of a zoom lens according to a first numerical example of the present invention at the wide-angle end.

Zoom lenses according to embodiments of the present invention will be described with reference to the drawings.

Each of the zoom lenses according to the embodiments of the present invention includes a first lens unit having a positive refractive power, a second lens unit having a negative refractive power, a third lens unit having a positive refractive power, a fourth lens unit having a negative refractive power, and a fifth lens unit having a positive refractive power in order from the object side to the image side.

In each of the zoom lenses according to the embodiments of the present invention, all of the lens units move during zooming from the wide-angle end to the telephoto end. More specifically, the lens units move such that the distance between the first and second lens units L1 and L2 at the telephoto end is larger than that at the wide-angle end and the distance between the third and fifth lens units L3 and L5 at the telephoto end is larger than that at the wide-angle end.

Since all of the lens units are moved during zooming from the wide-angle end to the telephoto end, the zoom ratio can be increased and the size can be reduced at the same time.

More specifically, during zooming, the magnification is changed by increasing the distance between the first lens unit L1 and the second lens unit L2. However, the third lens unit L3 is also moved during zooming, so that the entrance pupil can be moved to a suitable position at the telephoto end. Accordingly, the lens diameter can be reduced.

Since the third lens unit L3 is moved, the third lens unit L3 also contributes to the function of changing the magnification provided by the first lens unit L1 and the second lens unit L2. Therefore, the amounts of movement of the first lens unit L1 and the second lens unit L2 for changing the magnification can be reduced. As a result, the overall lens length (distance between the lens surface closest to the object side in the first lens unit L1 and an image plane IP along an optical axis) at the telephoto end can be reduced.

In addition, since the fifth lens unit L5 is also moved during zooming, the zoom ratio can be further increased. A high zoom ratio can be obtained by increasing the distance between the third lens unit L3 and the fifth lens unit L5 during zooming from the wide-angle end to the telephoto end.

When f4 is a focal length of the fourth lens unit L4, f5 is a focal length of the fifth lens unit L5, fw is a focal length of the entire system at a wide-angle end, and ft is a focal length of the entire system at a telephoto end, the refractive power of the fourth lens unit L4 and the refractive power of the fifth lens unit L5 are adequately set so as to satisfy the following condition:

$$0.01 \leq (|f4|/f5)/Z \leq 0.11 \qquad (1)$$

$$Z = ft/fw$$

Conditional Expression (1) relates to the ratio between the refractive powers of the fourth and fifth lens units L4 and L5 with respect to the zoom ratio Z in the zooming operation.

According to the present invention, to obtain a high zoom ratio, the fourth lens unit and the fifth lens unit are moved during zooming. The zoom ratio can be increased, the optical performance can be improved, and the size can be reduced at the same time by adequately setting the refractive powers of the fourth and fifth lens units.

If the value of Conditional Expression (1) is less than the lower limit thereof, a large image-plane variation occurs in the wide-angle range and it is difficult to maintain high optical performance. In addition, the amount of movement of the fourth lens unit L4 increases, and therefore it is difficult to reduce the size of the system.

If the value of Conditional Expression (1) is greater than the upper limit thereof, a large image-plane variation occurs in the telephoto range. In addition, if the amount of movement of the fifth lens unit L5 is increased to obtain a high zoom ratio, it is difficult to reduce the size of the entire system.

The structures of the zoom lenses according to the embodiments of the present invention will be described in detail below.

Figure 2B:
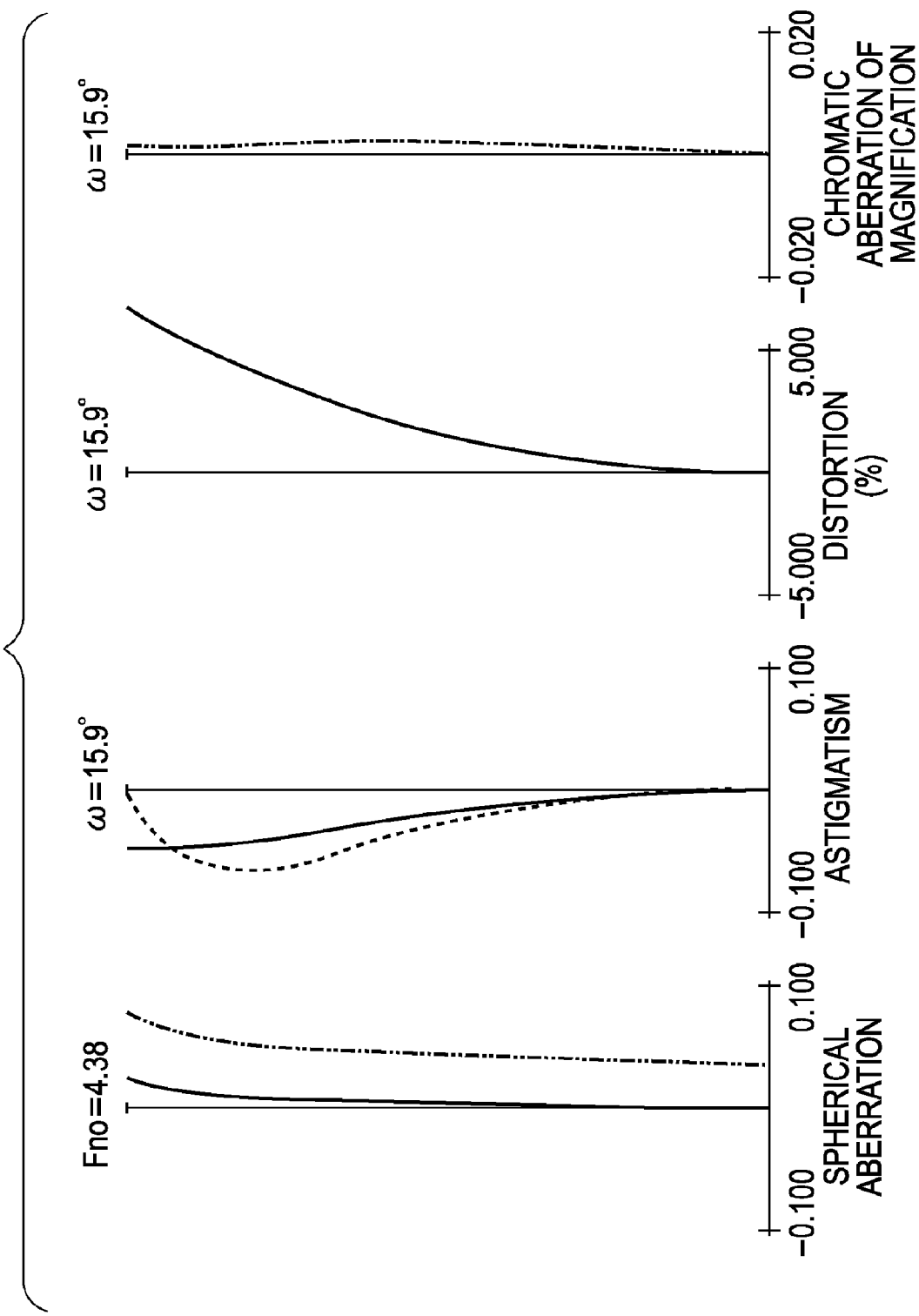

FIG. 1 is a sectional view of a zoom lens according to a first numerical example of the present invention at the wide-angle end (short-focal-length end). FIGS. 2A to 2C illustrate aberration diagrams of the zoom lens according to the first numerical example of the present invention.

FIG. 3 is a sectional view of a zoom lens according to a second numerical example of the present invention at the wide-angle end. FIGS. 4A to 4C illustrate aberration diagrams of the zoom lens according to the second numerical example of the present invention.

FIG. 5 is a sectional view of a zoom lens according to a third numerical example of the present invention at the wide-angle end. FIGS. 6A to 6C illustrate aberration diagrams of the zoom lens according to the third numerical example of the present invention.

Figure 7:
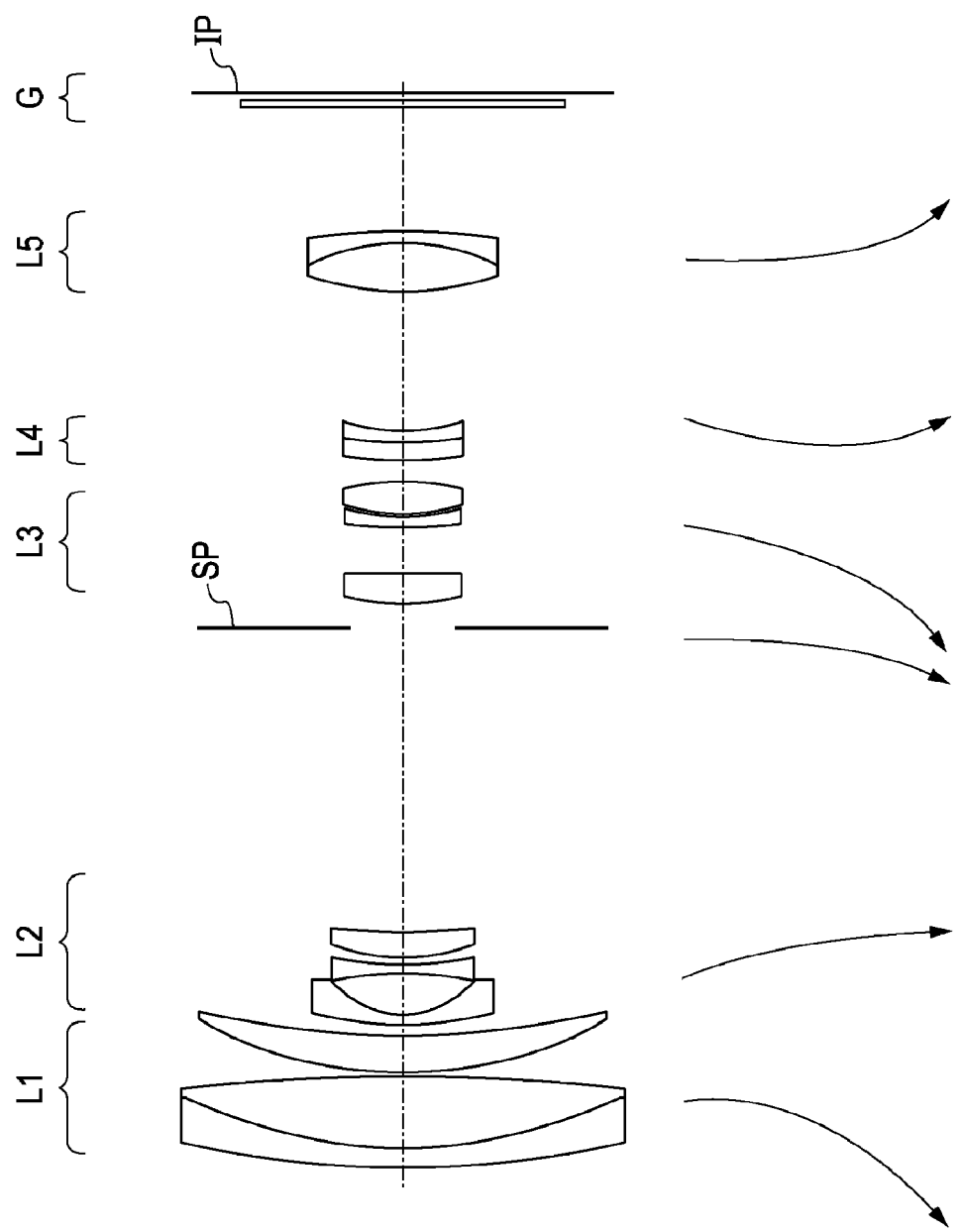
FIG. 7 is a sectional view of a zoom lens according to a fourth numerical example of the present invention at the wide-angle end.

FIG. 7 is a sectional view of a zoom lens according to a fourth numerical example of the present invention at the wide-angle end. FIGS. 8A to 8C illustrate aberration diagrams of the zoom lens according to the fourth numerical example of the present invention.

Figure 10B:
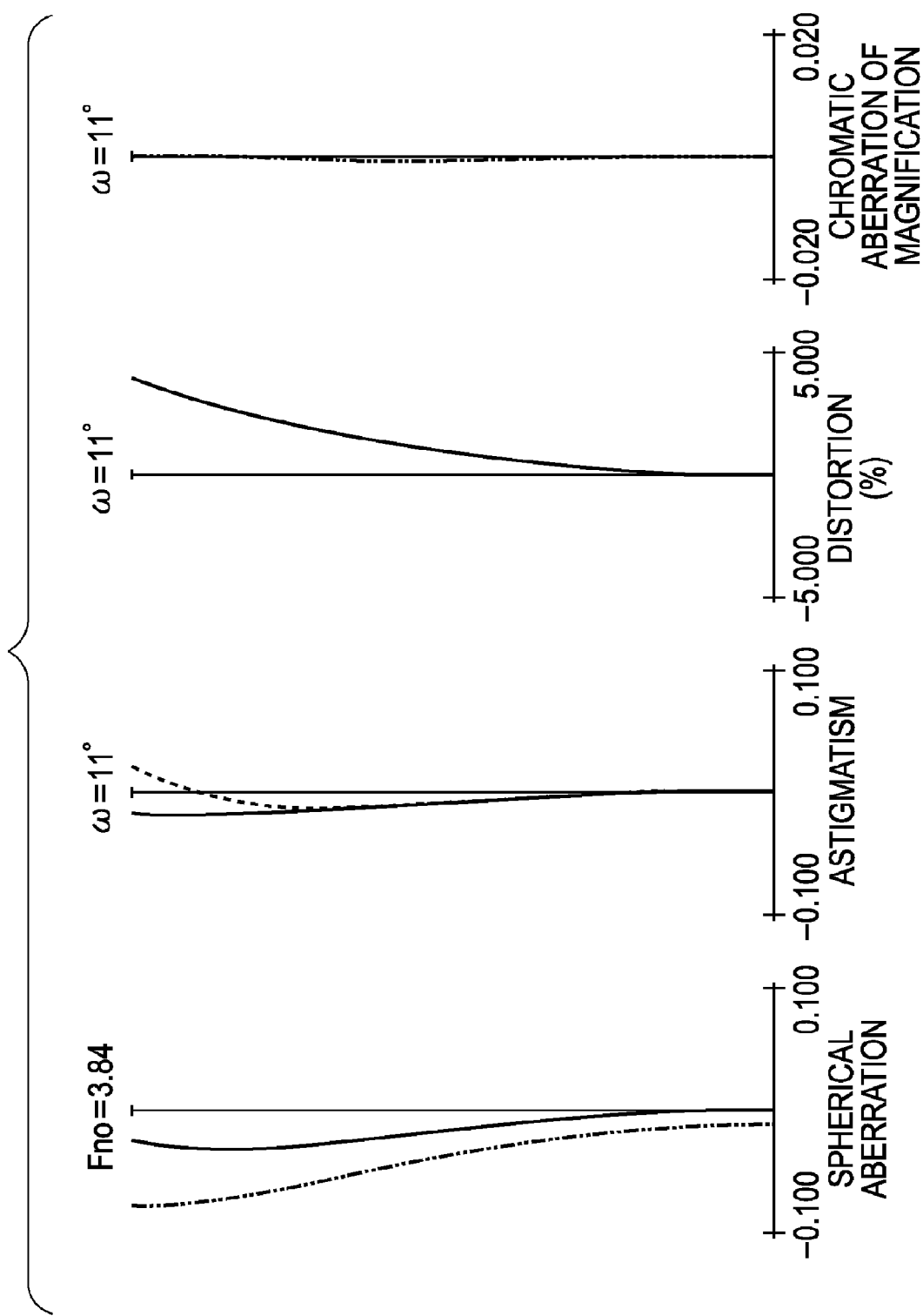

FIG. 9 is a sectional view of a zoom lens according to a fifth numerical example of the present invention at the wide-angle end. FIGS. 10A to 10C illustrate aberration diagrams of the zoom lens according to the fifth numerical example of the present invention.

Figure 12B:
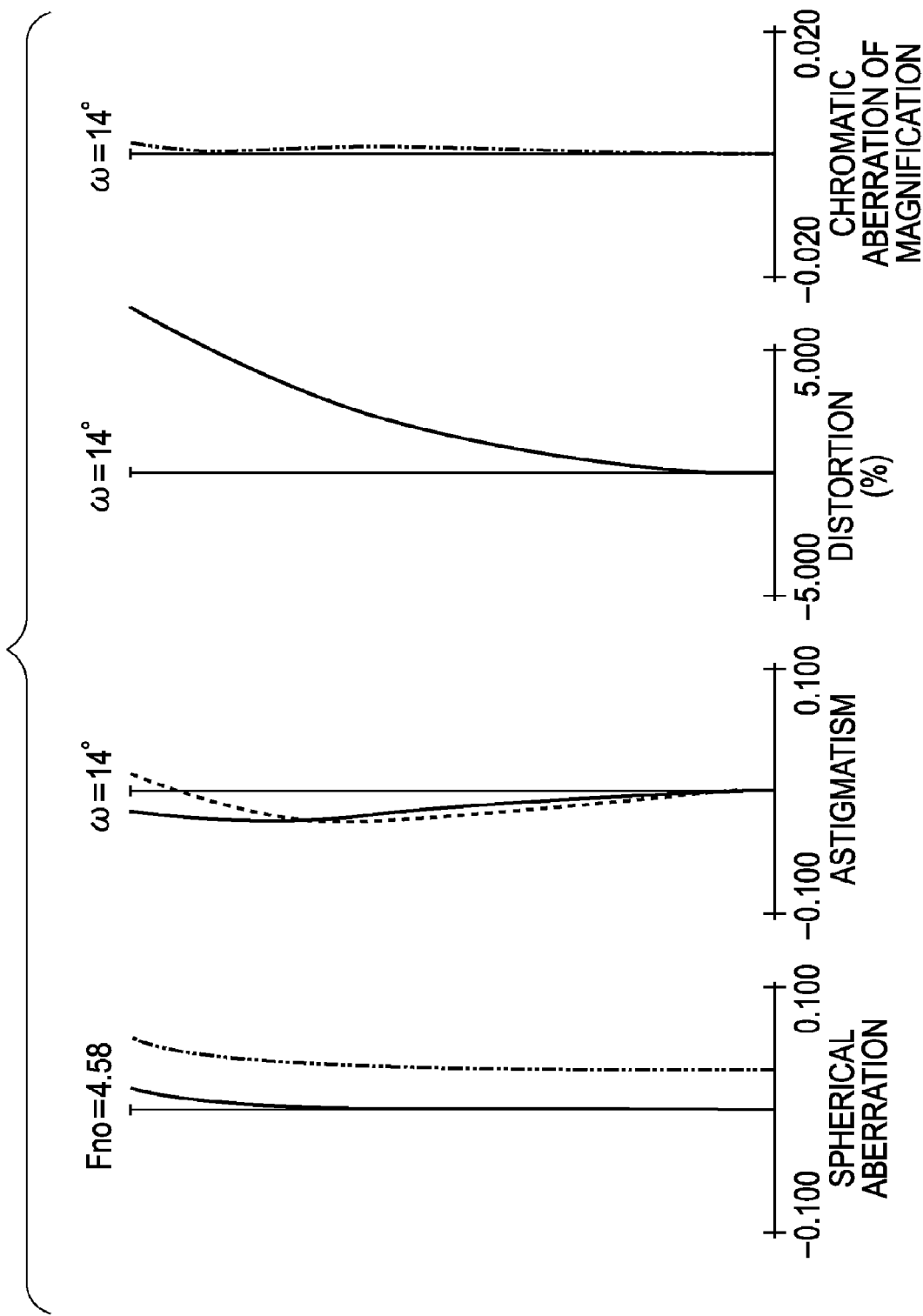
Figure 12C:
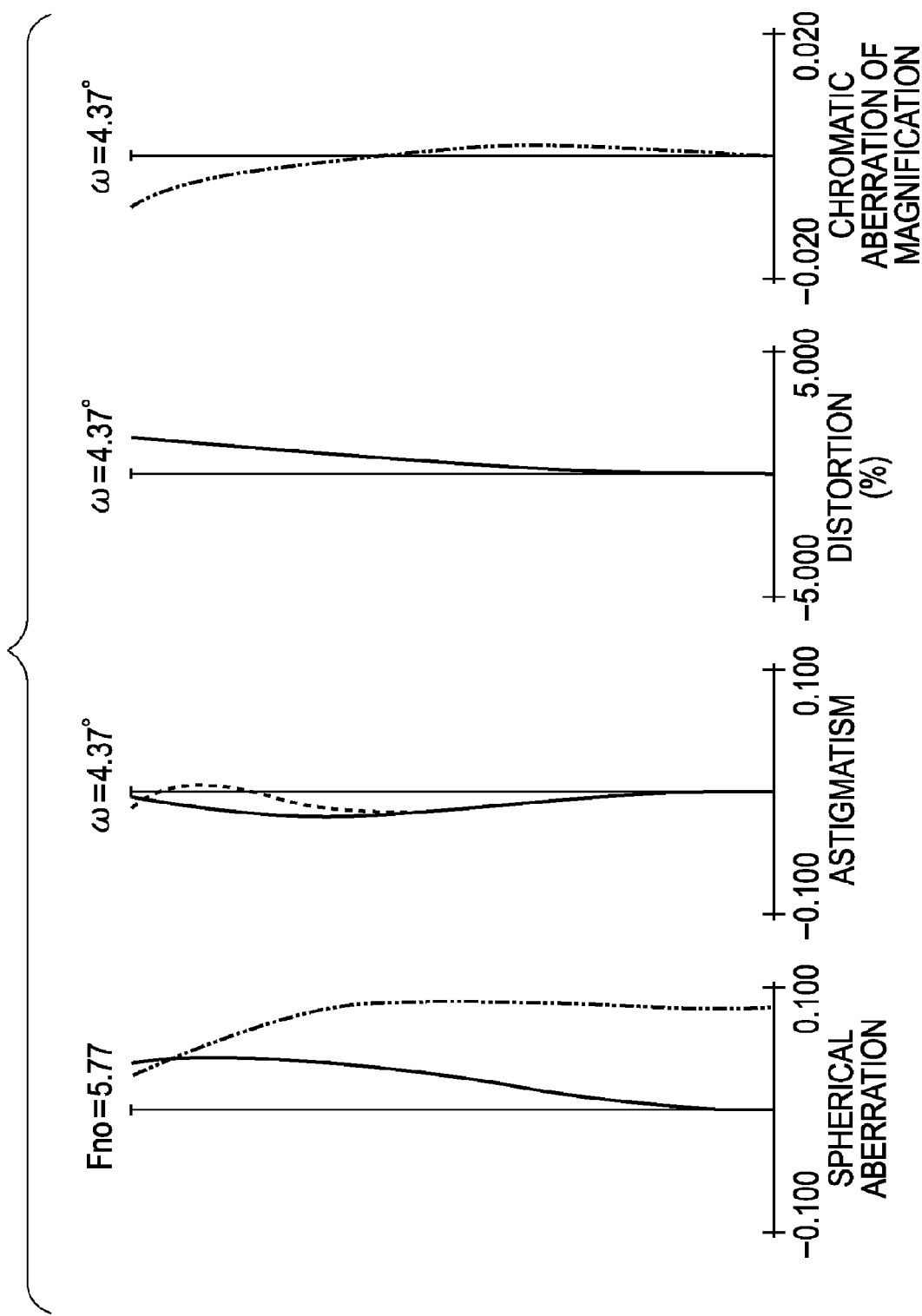

FIG. 11 is a sectional view of a zoom lens according to a sixth numerical example of the present invention at the wide-angle end. FIGS. 12A to 12C illustrate aberration diagrams of the zoom lens according to the sixth numerical example of the present invention.

Figure 13:
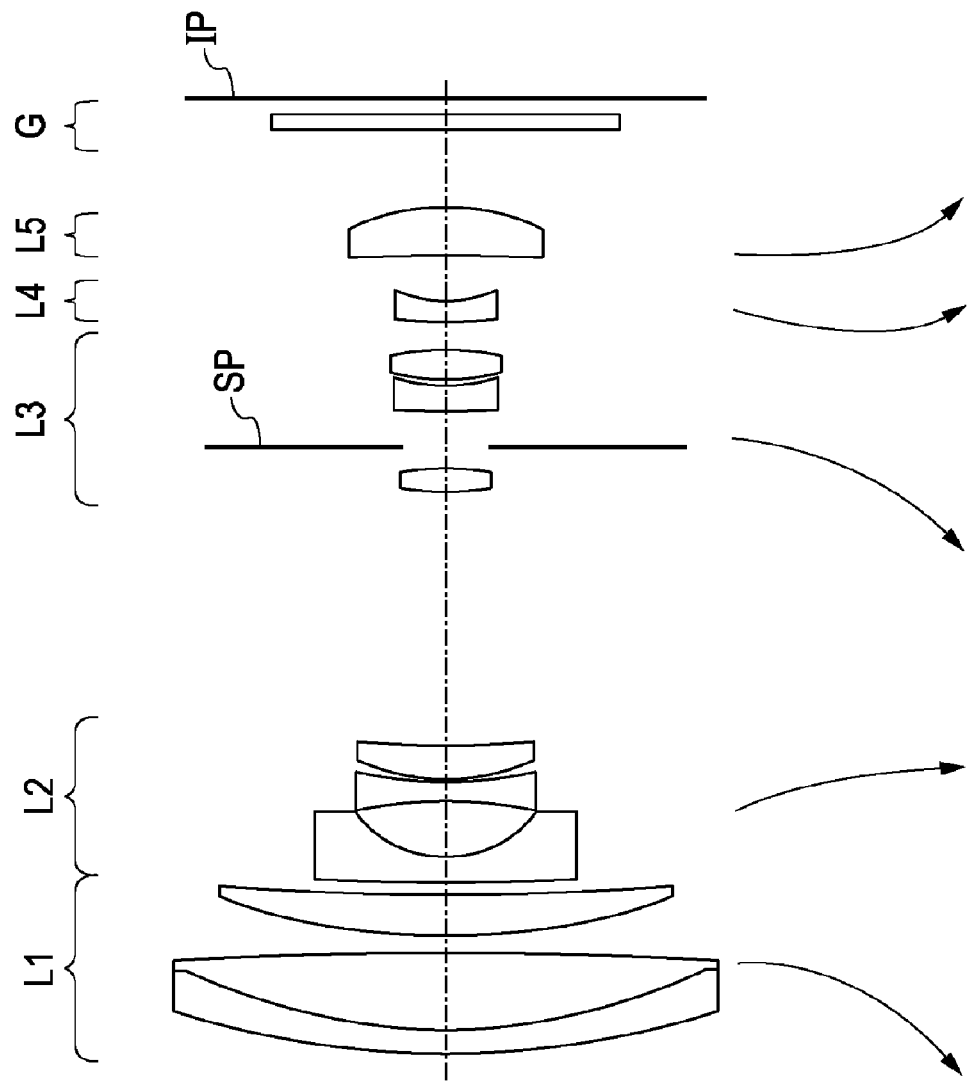
FIG. 13 is a sectional view of a zoom lens according to a seventh numerical example of the present invention at the wide-angle end.

FIG. 13 is a sectional view of a zoom lens according to a seventh numerical example of the present invention at the wide-angle end. FIGS. 14A to 14C illustrate aberration diagrams of the zoom lens according to the seventh numerical example of the present invention.

Figure 15:
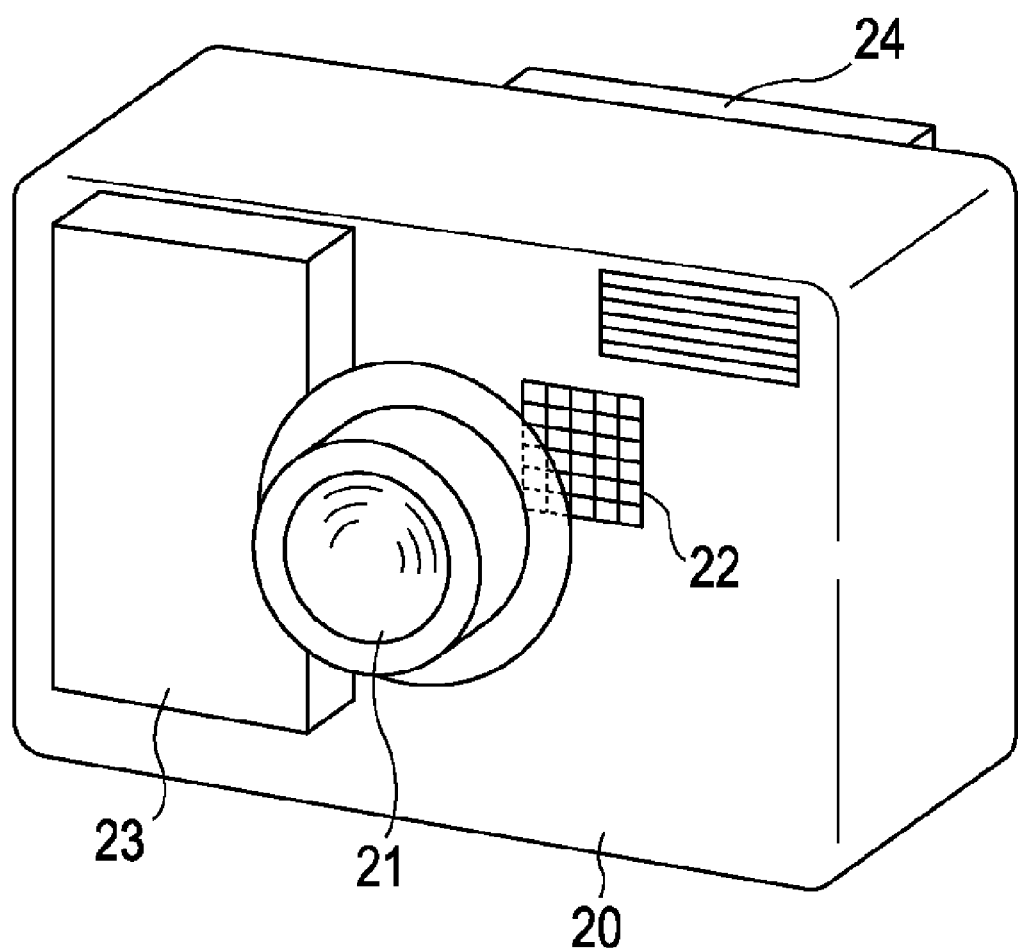
FIG. 15 is a schematic diagram illustrating the main part of an image-pickup apparatus according to an embodiment of a present invention.

FIG. 15 is a schematic diagram illustrating the main part of an image-pickup apparatus according to an embodiment of a present invention.

The zoom lens according to each example is an imaging lens system used in an image pickup apparatus, such as a video camera, a digital camera, or a silver-halide film camera. In the sectional view of each zoom lens, the left side shows the object side (front) and the right side shows the image side (rear).

Referring to the sectional views, each zoom lens includes a first lens unit L1 having a positive refractive power (optical power is the reciprocal of focal length), a second lens unit L2 having a negative refractive power, a third lens unit L3 having a positive refractive power, a fourth lens unit L4 having a negative refractive power, and a fifth lens unit L5 having a positive refractive power.

SP denotes an F-number determining member (hereinafter referred to also as an "aperture stop") that serves as an aperture stop which determines (restricts) the open F-number (Fno) luminous flux.

IP denotes an image plane. In the case where the zoom lens is used as an imaging optical system of a video camera or a digital still camera, an image pickup plane of a solid-state image pickup element (photoelectric conversion element), such as a CCD sensor or a CMOS sensor, is positioned at the image plane IP. In the case where the zoom lens is used as an imaging optical system of a silver-halide film camera, a photosensitive surface, which corresponds to a film surface, is positioned at the image plane IP.

In the aberration diagrams showing the spherical aberration, the solid line and the dot-dot dash line are d-line and g-line, respectively. In the aberration diagrams showing the astigmatism, the d-line is used as the reference, and the solid line and the dot-dot dash line correspond to a sagittal image plane and an area meridional image plane, respectively. In addition, in the aberration diagrams showing the distortion and chromatic aberration of magnification, the d-line and the g-line, respectively, are used as the reference. Fno denotes the F-number, ω denotes a half field angle, and h denotes an image height.

The wide-angle end and the telephoto end are zooming positions corresponding to the states in which the magnification-varying lens unit is at one and other ends of a mechanically moveable range along an optical axis.

In the sectional views of the zoom lenses, loci along which the lens units are moved during zooming from the wide-angle end to the telephoto end are shown by the arrows.

In each example, during zooming from the wide-angle end to the telephoto end, the first lens unit L1 moves toward the object side, the second lens unit L2 moves toward the image side, the third lens unit L3 moves toward the object side, the fourth lens unit L4 moves along a locus that is convex toward the object side, and the fifth lens unit L5 moves toward the image side. Thus, in each example, all of the lens units included in the zoom lens move during zooming from the wide-angle end to the telephoto end.

The lens structure of each of the zoom lenses according to the examples will now be described.

The first lens unit L1 includes a cemented lens including a negative meniscus lens having a convex surface on the object side and a positive lens, and a positive meniscus lens having a convex surface on the object side in order from the object side to the image side.

In the first example and the fourth to seventh examples, the second lens unit L2 includes a negative meniscus lens having a concave surface on the image side, a biconcave negative lens, and a positive meniscus lens having a convex surface on the object side in order from the object side to the image side. In the second and third examples, the second lens unit L2 includes two negative meniscus lenses having a concave surface on the image side, a negative meniscus lens having a concave surface on the object side, and a positive lens having a convex surface on the object side in order from the object side to the image side.

Thus, in the second lens unit L2, the diameter of the front can be reduced and the variation in chromatic aberration during zooming can be reduced at the same time. In addition, over the entire zooming range from the wide-angle end to the telephoto end, variation in the field curvature and the spherical aberration at the telephoto end can be adequately corrected. In particular, the astigmatism and distortion can be adequately corrected at the wide-angle end.

In the first example and the fourth to seventh examples, the third lens unit L3 includes a biconvex positive lens, a negative meniscus lens having a concave surface on the image side, and a biconvex positive lens in order from the object side to the image side. In the second and third examples, the third lens unit L3 includes a biconvex positive lens, a negative meniscus lens having a concave surface on the image side, and a cemented lens including a negative meniscus lens having a concave surface on the image side and a biconvex positive lens in order from the object side to the image side.

Thus, the third lens unit L3 includes one or more positive lenses including a positive lens disposed at a position closest to the object side and one or more negative lenses. At least one of the positive lenses included in the third lens unit L3 is an aspherical lens. According to this structure, the spherical aberration and the field curvature can be adequately corrected.

The fourth lens unit L4 is constituted of a single negative lens, a cemented lens including two negative lenses, or a cemented lens including a positive lens and a negative lens.

The fifth lens unit L5 is constituted of a positive lens having a convex surface on the image side or a cemented lens including a biconvex positive lens and a negative meniscus lens having a concave surface on the object side.

Focusing can be performed by moving the fourth lens unit L4 or the fifth lens unit L5 along the optical axis of the zoom lens. In such a case, variation in aberrations during focusing can be suppressed to a relatively low level.

To prevent vibration, the imaging position can be changed by moving a part or the entire body of the third lens unit in a direction having a component that is perpendicular to the optical axis of the zoom lens. In such a case, variation in eccentric aberration (aberration due to eccentricity) can be suppressed to a relatively low level.

As described above, in the first to seventh examples, the ratio between the refractive powers of the fourth and fifth lens unit L4 and L5 with respect to the zoom ratio Z is adequately set so as to satisfy Conditional Expression (1). Accordingly, a small, high-zoom-ratio zoom lens having high optical performance and a large field angle at the wide-angle end is provided.

In the zoom lens of each example, the following conditions can also be additionally satisfied to solve various technical problems.

That is, when f2 is a focal length of the second lens unit L2 and f5 is a focal length of the fifth lens unit L5, one or both of the following conditions can be satisfied:

$$0.01 \leq |f2|/ft \leq 0.20 \quad (2)$$

$$0.10 \leq (f5/|f2|)/Z \leq 0.25 \quad (3)$$

Conditional Expression (2) relates to a numerical range of the ratio of the focal length f2 of the second lens unit L2 to the focal length ft of the entire system at the telephoto end.

If the value of Conditional Expression (2) is less than the lower limit thereof, the refractive power of the second lens unit L2 is too high and large amounts of aberrations are generated at the second lens unit L2. In particular, large amounts of field curvature and astigmatism are generated. Therefore, the number of lenses must be increased or an aspherical surface must be added to correct the aberrations; this is disadvantageous from the viewpoint of manufacturing costs.

Conversely, if the value of Conditional Expression (2) is greater than the upper limit thereof, the aberrations can be effectively corrected. However, the second lens unit L2 must be moved by a large distance in the magnification-varying process, and the overall lens length is increased accordingly.

Conditional Expression (3) relates to a numerical range of the ratio between the focal lengths of the second and fifth lens units L2 and L5 with respect to the ratio between the focal lengths of the overall system at the wide-angle end and the telephoto end.

If the value of Conditional Expression (3) is less than the lower limit thereof, the magnification-varying effect obtained by the second lens unit L2 is too low. Therefore, the second lens unit L2 must be moved by a large distance in the magnification-varying process, and the overall lens length is increased accordingly.

In addition, the refractive power of the fifth lens unit L5 is too high and large amounts of aberrations are generated at the fifth lens unit L5. In particular, large amounts of field curvature and astigmatism are generated.

Conversely, if the value of Conditional Expression (3) is greater than the upper limit thereof, the refractive power of the second lens unit L2 is too high and large amounts of aberrations are generated at the second lens unit L2. In particular, large amounts of field curvature and astigmatism are generated.

When β3w and β3t are the lateral magnifications of the third lens unit L3 at the wide-angle end and the telephoto end, respectively, and β5w and β5t are the lateral magnifications of the fifth lens unit L5 at the wide-angle end and the telephoto end, respectively, one or both of the following conditions can be satisfied:

$$0.01 \leq (\beta 3t/\beta 3w)/Z \leq 0.20 \quad (4)$$

$$0.01 \leq (|\beta 5t|/|\beta 5w|)/Z \leq 0.14 \quad (5)$$

In the above expressions, Z is the zoom ratio (ft/fw).

The Conditional Expression (4) relates to the magnification-varying effect which is provided by the third lens unit L3.

If the value of Conditional Expression (4) is less than the lower limit thereof, the magnification-varying effect of the third lens unit L3 is low and it is necessary to increase the refractive power of the second lens unit L2. Therefore, it is difficult to suppress the image-plane variation during zooming.

Conversely, if the value of Conditional Expression (4) is greater than the upper limit thereof, the size of the entire system can be effectively reduced. However, large amounts of field curvature and astigmatism are generated.

The Conditional Expression (5) relates to the magnification-varying effect which is provided by the fifth lens unit L5.

If the value of Conditional Expression (5) is less than the lower limit thereof, the magnification-varying effect of the fifth lens unit L5 is low. Therefore, the fifth lens unit L5 is to be moved by a large distance during zooming from the wide-angle end to the telephoto end, and it is difficult to reduce the size of the entire system.

Conversely, if the value of Conditional Expression (5) is greater than the upper limit thereof, the size of the overall system can be effectively reduced. However, large amounts of field curvature and astigmatism are generated.

The zoom lenses according to the first to seventh examples satisfy all of the above-described Conditional Expressions (2) to (5). However, it is not necessary that all of the conditional expressions be satisfied at the same time. The above-described effects can be individually obtained by satisfying the corresponding conditional expressions.

The numerical ranges of Conditional Expressions (1) to (5) can also be set as follows:

$$0.06 \leq (|f4|/f5)/Z \leq 0.108 \quad (1a)$$

$$0.07 \leq |f2|/ft \leq 0.15 \quad (2a)$$

$$0.104 \leq (f5/|f2|)/Z \leq 0.241 \quad (3a)$$

$$0.05 \leq (\beta 3t/\beta 3w)/Z \leq 0.19 \quad (4a)$$

$$0.04 \leq (|\beta 5t|/|\beta 5w|)/Z \leq 0.131 \quad (5a)$$

Next, a digital still camera including a zoom lens according to at least one of the above-described examples as an imaging optical system will be described with reference to FIG. 15.

Referring to FIG. 15, a camera body 20 includes an imaging optical system 21 including the zoom lens according to at least one of the first to seventh examples. A solid-state image pickup element (photoelectric conversion element) 22, such as a CCD sensor and a CMOS sensor, for receiving an object image formed by the imaging optical system 21 is disposed in the camera body 20. A memory 23 records information corresponding to the object image that is subjected to photoelectric conversion performed by the solid-state image pickup device 22. A finder 24 is formed of, for example, a liquid crystal display panel or the like and allows a user to observe the object image formed on the image-pickup element 22.

When the zoom lens according to at least one of the examples of the present invention is included in an image pickup apparatus, such as the digital still camera, a small image pickup apparatus which provides high optical performance can be obtained.

The first to seventh numerical examples will now be described in detail. In each numerical example, i denotes the number counted from the object side, ri denotes the radius of curvature of the $i^{th}$ surface from the object side, di denotes the lens thickness or air distance for the $i^{th}$ surface from the object side, and ni and vi respectively denote the refractive index and the Abbe number of the $i^{th}$ material from the object side. BF denotes the back focus.

Table 1 shows the relationship between Conditional Expressions (1) to (5) and the first to seventh numerical examples.

In Table 1, β2w and β2t, which are the lateral magnifications of the second lens unit L2 at the wide-angle end and the telephoto end, respectively, and β4w and β4t, which are the lateral magnifications of the fourth lens unit L4 at the wide-angle end and the telephoto end, respectively, are shown for reference.

When the optical axis is the X axis, an axis perpendicular to the optical axis is the H axis, the direction in which light travels is the positive direction, R is a paraxial radius of curvature, k is the conic constant, and $A_4$ to $A_{10}$ are aspherical coefficients, the shape of the aspherical surface is expressed as follows:

$$X = \frac{\frac{H^2}{R}}{1 + \sqrt{1 - (1+k)\left(\frac{H}{R}\right)^2}} + A_4 H^4 + A_6 H^6 + A_8 H^8 + A_{10} H^{10}$$

The symbol '*' is added to the surface numbers for the aspherical surfaces. In addition, "e-x" means "$10^{-x}$".

FIRST NUMERICAL EXAMPLE

Unit: mm

| Surface Data | | | | |
|---|---|---|---|---|
| Surface Number | r | d | nd | vd |
| 1 | 46.387 | 0.91 | 1.84666 | 23.9 |
| 2 | 29.238 | 3.92 | 1.48749 | 70.2 |
| 3 | −274.226 | 0.63 | | |
| 4 | 33.397 | 2.47 | 1.71300 | 53.9 |
| 5 | 107.612 | (variable) | | |
| 6 | 102.207 | 1.07 | 1.88300 | 40.8 |
| 7 | 5.722 | 2.80 | | |
| 8 | −22.530 | 0.89 | 1.77250 | 49.6 |
| 9 | 17.499 | 0.08 | | |
| 10 | 10.741 | 2.69 | 1.92286 | 18.9 |
| 11 | 72.161 | (variable) | | |
| 12* | 15.035 | 0.99 | 1.58313 | 59.4 |
| 13* | −13.224 | 1.28 | | |
| 14 (aperture) | ∞ | 2.03 | | |
| 15 | 71.351 | 1.49 | 1.92286 | 18.9 |
| 16 | 9.857 | 0.17 | | |
| 17 | 10.414 | 1.63 | 1.77250 | 49.6 |
| 18 | −9.896 | (variable) | | |
| 19* | 32.734 | 1.04 | 1.69350 | 53.2 |
| 20* | 5.680 | (variable) | | |
| 21 | −610.102 | 1.60 | 1.88300 | 40.8 |
| 22 | −11.363 | (variable) | | |

-continued

| | | | | |
|---|---|---|---|---|
| 23 | ∞ | 0.80 | 1.51633 | 64.1 |
| 24 | ∞ | (variable) | | |

Aspherical Surface Data

12th surface

K = −1.53973e+000   A4 = −1.70567e−004   A6 = 2.06757e−005
A8 = −1.75786e−006   A10 = 8.45932e−009

13th surface

K = −3.81666e+000   A4 = 1.77528e−004   A6 = 2.11832e−005
A8 = −1.19231e−006   A10 = 1.78553e−008

19th surface

K = 8.95045e−001   A4 = −7.28776e−005   A6 = 8.74312e−006
A8 = −2.04432e−007   A10 = 3.51374e−009

20th surface

K = 3.70279e−001   A4 = 2.87976e−004   A6 = −2.79339e−005
A8 = 5.99582e−006   A10 = −3.97598e−007

Other Data

| Zoom Ratio | | 9.78 | |
|---|---|---|---|
| Focal Length | 4.34 | 13.47 | 42.42 |
| F-number | 3.10 | 4.38 | 5.77 |
| Field Angle | 41.60 | 15.95 | 5.19 |
| Image Height | 3.85 | 3.85 | 3.85 |
| Overall Lens Length | 49.11 | 58.19 | 70.06 |
| BF | 5.20 | 3.94 | 3.15 |
| d5 | 0.46 | 12.62 | 24.10 |
| d11 | 13.63 | 5.23 | 0.85 |
| d18 | 1.53 | 2.77 | 3.01 |
| d20 | 2.29 | 7.64 | 12.97 |
| d22 | 4.08 | 2.82 | 2.03 |
| d24 | 0.59 | 0.59 | 0.59 |

Zoom Lens Unit Data

| Unit No. | First Surface | Focal Length |
|---|---|---|
| 1 | 1 | 44.71 |
| 2 | 6 | −6.65 |
| 3 | 12 | 8.22 |
| 4 | 19 | −10.07 |
| 5 | 21 | 13.10 |

SECOND NUMERICAL EXAMPLE

Unit: mm

Surface Data

| Surface Number | r | d | nd | vd |
|---|---|---|---|---|
| 1 | 74.617 | 1.03 | 1.80610 | 33.3 |
| 2 | 37.299 | 5.56 | 1.49700 | 81.5 |
| 3 | 3046.357 | 0.19 | | |
| 4 | 39.377 | 3.98 | 1.60311 | 60.6 |
| 5 | 205.617 | (variable) | | |
| 6 | 45.387 | 0.99 | 1.88300 | 40.8 |
| 7 | 10.767 | 2.51 | | |
| 8 | 41.964 | 1.02 | 1.80400 | 46.6 |
| 9 | 9.990 | 3.45 | | |
| 10 | −21.358 | 1.02 | 1.74950 | 35.3 |
| 11 | −105.249 | 0.19 | | |
| 12 | 22.078 | 1.98 | 1.92286 | 18.9 |
| 13 | −695.286 | (variable) | | |
| 14 (aperture) | ∞ | (variable) | | |
| 15* | 12.158 | 3.27 | 1.58313 | 59.4 |
| 16 | −124.109 | 1.53 | | |
| 17 | 26.401 | 1.48 | 1.71999 | 50.2 |
| 18 | 14.051 | 1.80 | | |
| 19 | 20.381 | 1.91 | 2.00330 | 28.3 |
| 20 | 8.538 | 2.00 | 1.60311 | 60.6 |
| 21 | −35.125 | (variable) | | |
| 22 | 36.376 | 2.31 | 1.80518 | 25.4 |
| 23 | 26.373 | 1.16 | 1.60311 | 60.6 |
| 24 | 14.969 | (variable) | | |
| 25 | 15.688 | 4.50 | 1.58313 | 59.4 |
| 26 | −10.529 | 1.56 | 1.60342 | 38.0 |
| 27 | −35.467 | (variable) | | |
| 28 | ∞ | 0.80 | 1.51633 | 64.1 |
| 29 | ∞ | (variable) | | |

Aspherical Surface Data

15th surface

K = 1.91328e−001   A4 = −8.66915e−005   A6 = −5.46115e−007
A8 = 2.82575e−008   A10 = −1.01872e−009

Other Data

| Zoom Ratio | | 19.40 | |
|---|---|---|---|
| Focal Length | 4.79 | 15.11 | 92.89 |
| F-number | 2.87 | 3.87 | 5.60 |
| Field Angle | 38.80 | 14.29 | 2.37 |
| Image Height | 3.85 | 3.85 | 3.85 |
| Overall Lens Length | 91.81 | 100.17 | 123.52 |
| BF | 9.07 | 13.48 | 10.26 |
| d5 | 0.94 | 19.83 | 45.80 |
| d13 | 25.04 | 9.01 | 0.90 |
| d14 | 11.13 | 4.96 | 1.09 |
| d21 | 0.90 | 3.90 | 14.10 |
| d24 | 1.02 | 5.28 | 7.65 |
| d27 | 7.00 | 11.41 | 8.19 |
| d29 | 1.54 | 1.54 | 1.54 |

Zoom Lens Unit Data

| Unit No. | First Surface | Focal Length |
|---|---|---|
| 1 | 1 | 67.95 |
| 2 | 6 | −9.82 |
| 3 | 15 | 19.83 |
| 4 | 22 | −41.62 |
| 5 | 25 | 19.97 |

THIRD NUMERICAL EXAMPLE

Unit: mm

Surface Data

| Surface Number | r | d | nd | vd |
|---|---|---|---|---|
| 1 | 77.859 | 1.90 | 1.80610 | 33.3 |
| 2 | 38.162 | 5.50 | 1.49700 | 81.5 |
| 3 | 5579.689 | 0.20 | | |
| 4 | 39.435 | 4.30 | 1.60311 | 60.6 |
| 5 | 193.345 | (variable) | | |
| 6 | 46.636 | 1.00 | 1.83481 | 42.7 |
| 7 | 10.369 | 2.70 | | |
| 8 | 24.826 | 0.85 | 1.77250 | 49.6 |
| 9 | 9.988 | 3.60 | | |
| 10 | −22.515 | 0.80 | 1.83481 | 42.7 |
| 11 | −340.954 | 0.12 | | |
| 12 | 21.755 | 2.25 | 1.92286 | 18.9 |
| 13 | 923.134 | (variable) | | |
| 14 (aperture) | ∞ | (variable) | | |
| 15* | 11.916 | 3.45 | 1.58313 | 59.4 |
| 16 | −84.373 | 2.80 | | |
| 17 | 42.190 | 1.15 | 1.60342 | 38.0 |

-continued

| | | | | |
|---|---|---|---|---|
| 18 | 13.010 | 0.30 | | |
| 19 | 22.098 | 0.80 | 2.00330 | 28.3 |
| 20 | 8.458 | 2.15 | 1.71999 | 50.2 |
| 21 | −44.763 | (variable) | | |
| 22 | 63.020 | 1.00 | 1.76182 | 26.5 |
| 23 | 58.335 | 0.60 | 1.60311 | 60.6 |
| 24 | 18.000 | (variable) | | |
| 25 | 20.910 | 4.00 | 1.77250 | 49.6 |
| 26 | −10.871 | 0.60 | 1.80610 | 33.3 |
| 27 | −48.531 | (variable) | | |
| 28 | ∞ | 0.80 | 1.51633 | 64.1 |
| 29 | ∞ | (variable) | | |

Aspherical Surface Data
15th surface

K = 3.22611e−001  A4 = −1.03271e−004  A6 = −6.77678e−007
A8 = 5.18752e−008  A10 = −2.45955e−009

Other Data

| Zoom Ratio | | 19.24 | |
|---|---|---|---|
| Focal Length | 5.15 | 20.27 | 99.10 |
| F-number | 2.87 | 3.83 | 5.48 |
| Field Angle | 36.78 | 10.75 | 2.22 |
| Image Height | 3.85 | 3.85 | 3.85 |
| Overall Lens Length | 91.63 | 100.53 | 125.00 |
| BF | 10.49 | 18.16 | 10.34 |
| d5 | 0.90 | 24.02 | 47.08 |
| d13 | 24.11 | 5.11 | 1.74 |
| d14 | 10.39 | 3.54 | 1.01 |
| d21 | 1.00 | 3.39 | 11.83 |
| d24 | 4.40 | 5.98 | 12.66 |
| d27 | 7.81 | 15.48 | 7.66 |
| d29 | 2.15 | 2.15 | 2.15 |

Zoom Lens Unit Data

| Unit No. | First Surface | Focal Length |
|---|---|---|
| 1 | 1 | 69.78 |
| 2 | 6 | −9.86 |
| 3 | 15 | 19.13 |
| 4 | 22 | −42.07 |
| 5 | 25 | 20.35 |

FOURTH NUMERICAL EXAMPLE

Unit: mm

Surface Data

| Surface Number | r | d | nd | vd |
|---|---|---|---|---|
| 1 | 70.878 | 1.30 | 1.80610 | 33.3 |
| 2 | 32.968 | 4.70 | 1.49700 | 81.5 |
| 3 | −111.350 | 0.10 | | |
| 4 | 26.866 | 2.40 | 1.60311 | 60.6 |
| 5 | 54.549 | (variable) | | |
| 6 | 26.963 | 0.70 | 1.88300 | 40.8 |
| 7 | 6.026 | 2.60 | | |
| 8 | −20.552 | 0.60 | 1.69680 | 55.5 |
| 9 | 23.424 | 0.40 | | |
| 10 | 12.212 | 1.70 | 1.92286 | 18.9 |
| 11 | 39.217 | (variable) | | |
| 12 (aperture) | ∞ | 1.50 | | |
| 13* | 15.113 | 2.00 | 1.69350 | 53.2 |
| 14* | −110.436 | 3.00 | | |
| 15 | 45.026 | 0.60 | 1.84666 | 23.9 |
| 16 | 11.428 | 0.27 | | |
| 17 | 11.905 | 2.00 | 1.60311 | 60.6 |
| 18 | −19.292 | (variable) | | |

-continued

| | | | | |
|---|---|---|---|---|
| 19 | 25.973 | 1.20 | 1.76182 | 26.5 |
| 20 | 30.131 | 0.60 | 1.60311 | 60.6 |
| 21 | 9.597 | (variable) | | |
| 22 | 18.697 | 3.20 | 1.80400 | 46.6 |
| 23 | −13.236 | 0.60 | 1.80518 | 25.4 |
| 24 | −61.067 | (variable) | | |
| 25 | ∞ | 0.50 | 1.51633 | 64.1 |
| 26 | ∞ | (variable) | | |

Aspherical Surface Data
13th surface

K = −1.19364e+000  A4 = 2.35674e−005  A6 = −7.55800e−007
A8 = 8.65820e−008

14th surface

K = −1.55414e+003  A4 = −3.64989e−005  A6 = 3.74564e−006
A8 = 2.59198e−008

Other Data

| Zoom Ratio | | 16.66 | |
|---|---|---|---|
| Focal Length | 6.00 | 24.02 | 99.98 |
| F-number | 2.90 | 3.29 | 4.36 |
| Field Angle | 30.77 | 8.46 | 2.05 |
| Image Height | 3.57 | 3.57 | 3.57 |
| Overall Lens Length | 69.78 | 84.83 | 100.78 |
| BF | 8.96 | 15.90 | 6.10 |
| d5 | 0.70 | 23.55 | 38.58 |
| d11 | 19.83 | 3.89 | 1.47 |
| d18 | 1.50 | 3.94 | 4.18 |
| d21 | 9.15 | 7.92 | 20.80 |
| d24 | 8.19 | 15.12 | 5.32 |
| d26 | 0.45 | 0.45 | 0.45 |

Zoom Lens Unit Data

| Unit No. | First Surface | Focal Length |
|---|---|---|
| 1 | 1 | 55.06 |
| 2 | 6 | −8.10 |
| 3 | 13 | 14.16 |
| 4 | 19 | −27.14 |
| 5 | 22 | 18.21 |

FIFTH NUMERICAL EXAMPLE

Unit: mm

Surface Data

| Surface Number | r | d | nd | vd |
|---|---|---|---|---|
| 1 | 43.599 | 1.27 | 1.84666 | 23.9 |
| 2 | 27.041 | 3.88 | 1.48749 | 70.2 |
| 3 | 237.616 | 0.24 | | |
| 4 | 30.838 | 2.85 | 1.70731 | 54.3 |
| 5 | 121.146 | (variable) | | |
| 6 | 62.960 | 0.97 | 1.86845 | 42.1 |
| 7 | 6.958 | 3.29 | | |
| 8 | −29.264 | 0.85 | 1.81815 | 46.1 |
| 9 | 16.475 | 0.56 | | |
| 10 | 13.256 | 1.96 | 1.92286 | 18.9 |
| 11 | 73.933 | (variable) | | |
| 12* | 14.924 | 2.85 | 1.58313 | 59.4 |
| 13* | −19.197 | 2.39 | | |
| 14 (aperture) | ∞ | 2.09 | | |
| 15 | 40.818 | 0.97 | 1.92271 | 18.9 |
| 16 | 10.738 | 0.27 | | |
| 17 | 13.526 | 2.19 | 1.78736 | 48.5 |
| 18 | −16.033 | (variable) | | |

-continued

| | | | | |
|---|---|---|---|---|
| 19 | −172.133 | 0.85 | 1.57129 | 42.4 |
| 20* | 8.659 | (variable) | | |
| 21 | 156.632 | 2.18 | 1.78084 | 49.0 |
| 22 | −13.062 | (variable) | | |
| 23 | ∞ | 0.80 | 1.49000 | 70.0 |
| 24 | ∞ | (variable) | | |

Aspherical Surface Data

12th surface

K = −1.18045e+000   A4 = −1.07674e−004   A6 = −9.59113e−007
A8 = 3.58907e−009   A10 = −1.45640e−010

13th surface

K = −8.29356e+000   A4 = −8.00732e−005   A6 = 2.80192e−007
A8 = 7.05708e−009   A10 = −3.74408e−011

20th surface

K = 7.25552e−001    A4 = 1.34001e−004    A6 = −7.43617e−006
A8 = −1.34818e−008

Other Data

| Zoom Ratio | | 9.80 | |
|---|---|---|---|
| Focal Length | 5.38 | 19.88 | 52.69 |
| F-number | 2.88 | 3.84 | 4.18 |
| Field Angle | 35.60 | 10.96 | 4.18 |
| Image Height | 3.85 | 3.85 | 3.85 |
| Overall Lens Length | 61.81 | 67.16 | 77.83 |
| BF | 7.16 | 6.02 | 4.88 |
| d5 | 0.76 | 15.08 | 27.65 |
| d11 | 18.50 | 3.93 | 1.09 |
| d18 | 1.74 | 7.10 | 5.74 |
| d20 | 3.72 | 5.11 | 8.54 |
| d22 | 3.30 | 2.16 | 1.02 |
| d24 | 3.32 | 3.32 | 3.32 |

Zoom Lens Unit Data

| Unit No. | First Surface | Focal Length |
|---|---|---|
| 1 | 1 | 47.27 |
| 2 | 6 | −7.59 |
| 3 | 12 | 11.20 |
| 4 | 19 | −14.41 |
| 5 | 21 | 15.53 |

SIXTH NUMERICAL EXAMPLE

Unit: mm

Surface Data

| Surface Number | r | d | nd | vd |
|---|---|---|---|---|
| 1 | 45.487 | 1.15 | 1.84666 | 23.9 |
| 2 | 27.522 | 3.65 | 1.48749 | 70.2 |
| 3 | −182.544 | 0.20 | | |
| 4 | 32.533 | 2.03 | 1.71300 | 53.9 |
| 5 | 116.441 | (variable) | | |
| 6 | 253.910 | 1.00 | 1.88300 | 40.8 |
| 7 | 5.823 | 2.50 | | |
| 8 | −21.927 | 0.80 | 1.77250 | 49.6 |
| 9 | 19.018 | 0.22 | | |
| 10 | 10.866 | 1.53 | 1.92286 | 18.9 |
| 11 | 62.902 | (variable) | | |
| 12* | 13.143 | 1.91 | 1.58313 | 59.4 |
| 13* | −12.880 | 1.58 | | |
| 14 (aperture) | ∞ | 1.97 | | |
| 15 | 66.373 | 0.90 | 1.92286 | 18.9 |
| 16 | 9.666 | 0.10 | | |

-continued

| | | | | |
|---|---|---|---|---|
| 17 | 11.022 | 1.67 | 1.77250 | 49.6 |
| 18 | −10.269 | (variable) | | |
| 19 | 26.314 | 0.80 | 1.69350 | 53.2 |
| 20* | 5.731 | (variable) | | |
| 21 | −157.045 | 1.80 | 1.83481 | 42.7 |
| 22 | −12.096 | (variable) | | |
| 23 | ∞ | 0.80 | 1.51633 | 64.1 |
| 24 | ∞ | (variable) | | |

Aspherical Surface Data

12th surface

K = −2.39987e+000   A4 = −1.26814e−004   A6 = 2.25922e−005
A8 = −1.47250e−006   A10 = −1.37571e−010

13th surface

K = −5.10620e+000   A4 = 7.59035e−005    A6 = 2.25827e−005
A8 = −9.87818e−007   A10 = −3.53221e−011

20th surface

K = 2.67619e−001    A4 = 8.01417e−005    A6 = −8.57578e−006
A8 = −9.35838e−007

Other Data

| Zoom Ratio | | 9.78 | |
|---|---|---|---|
| Focal Length | 5.15 | 15.41 | 50.36 |
| F-number | 3.40 | 4.58 | 5.77 |
| Field Angle | 36.80 | 14.03 | 4.37 |
| Image Height | 3.85 | 3.85 | 3.85 |
| Overall Lens Length | 47.64 | 57.21 | 69.42 |
| BF | 5.89 | 4.94 | 4.12 |
| d5 | 0.68 | 12.96 | 24.60 |
| d11 | 12.68 | 4.95 | 1.01 |
| d18 | 1.22 | 2.54 | 2.10 |
| d20 | 3.09 | 7.73 | 13.52 |
| d22 | 5.00 | 4.05 | 3.24 |
| d24 | 0.36 | 0.36 | 0.36 |

Zoom Lens Unit Data

| Unit No. | First Surface | Focal Length |
|---|---|---|
| 1 | 1 | 41.85 |
| 2 | 6 | −6.64 |
| 3 | 12 | 8.39 |
| 4 | 19 | −10.74 |
| 5 | 21 | 15.61 |

SEVENTH NUMERICAL EXAMPLE

Unit: mm

Surface Data

| Surface Number | r | d | nd | vd |
|---|---|---|---|---|
| 1 | 46.080 | 1.10 | 1.84666 | 23.9 |
| 2 | 29.191 | 3.86 | 1.48749 | 70.2 |
| 3 | −254.439 | 0.87 | | |
| 4 | 32.994 | 2.08 | 1.71300 | 53.9 |
| 5 | 110.300 | (variable) | | |
| 6 | 171.921 | 1.32 | 1.88300 | 40.8 |
| 7 | 5.812 | 2.80 | | |
| 8 | −23.390 | 0.98 | 1.77250 | 49.6 |
| 9 | 18.976 | 0.10 | | |
| 10 | 10.860 | 1.80 | 1.92286 | 18.9 |

-continued

| | | | | |
|---|---|---|---|---|
| 11 | 64.617 | (variable) | | |
| 12* | 13.174 | 1.15 | 1.58313 | 59.4 |
| 13* | −12.917 | 1.10 | | |
| 14 (aperture) | ∞ | 1.86 | | |
| 15 | 91.424 | 1.30 | 1.92286 | 18.9 |
| 16 | 9.763 | 0.27 | | |
| 17 | 10.387 | 1.62 | 1.77250 | 49.6 |
| 18 | −9.915 | (variable) | | |
| 19* | 29.476 | 1.02 | 1.69350 | 53.2 |
| 20* | 5.641 | (variable) | | |
| 21 | −93.283 | 2.45 | 1.88300 | 40.8 |
| 22 | −11.593 | (variable) | | |
| 23 | ∞ | 0.80 | 1.51633 | 64.1 |
| 24 | ∞ | (variable) | | |

Aspherical Surface Data

12th surface

K = −2.35386e+000   A4 = −1.40772e−004   A6 = 1.49443e−005
A8 = −3.24701e−006   A10 = 5.43511e−009

13th surface

K = −4.06692e+000   A4 = 1.41380e−004   A6 = 2.53715e−005
A8 = −3.49722e−006   A10 = 2.15072e−008

19th surface

K = 8.85258e+005   A4 = −5.95611e−005   A6 = −1.08213e−006
A8 = 1.25880e−006   A10 = −1.95314e−008

20th surface

K = 3.52436e−001   A4 = 2.71289e−004   A6 = −2.84270e−005
A8 = 6.19290e−006   A10 = −3.77314e−007

Other Data

| Zoom Ratio | | 9.80 | |
|---|---|---|---|
| Focal Length | 4.81 | 4.97 | 47.14 |
| F-number | 3.16 | 3.15 | 5.77 |
| Field Angle | 38.69 | 37.77 | 4.67 |
| Image Height | 3.85 | 3.85 | 3.85 |
| Overall Lens Length | 48.44 | 47.43 | 70.26 |
| BF | 5.30 | 5.42 | 3.19 |
| d5 | 0.66 | 0.66 | 24.42 |
| d11 | 12.88 | 11.91 | 1.01 |
| d18 | 1.34 | 1.50 | 1.98 |
| d20 | 2.32 | 2.00 | 13.72 |
| d22 | 4.00 | 4.11 | 1.89 |
| d24 | 0.78 | 0.78 | 0.78 |

Zoom Lens Unit Data

| Unit No. | First Surface | Focal Length |
|---|---|---|
| 1 | 1 | 43.62 |
| 2 | 6 | −6.80 |
| 3 | 12 | 7.99 |
| 4 | 19 | −10.24 |
| 5 | 21 | 14.78 |

TABLE 1

| | 1st Example | 2nd Example | 3rd Example | 4th Example | 5th Example | 6th Example | 7th Example |
|---|---|---|---|---|---|---|---|
| fw | 4.3361 | 4.7887 | 5.3778 | 5.1500 | 6.0000 | 5.1464 | 4.8081 |
| ft | 42.4224 | 92.8917 | 52.6868 | 99.9934 | 99.9796 | 50.3563 | 47.1390 |
| Z | 9.7836 | 19.3987 | 9.7971 | 19.4162 | 16.6633 | 9.7847 | 9.8042 |
| f1 | 44.7096 | 67.9484 | 47.2742 | 69.7822 | 55.0589 | 41.8519 | 43.6197 |
| f2 | −6.6526 | −9.8189 | −7.5912 | −9.8590 | −8.1042 | −6.6429 | −6.7958 |
| f3 | 8.2188 | 19.8268 | 11.2009 | 19.1318 | 14.1640 | 8.3862 | 7.9943 |
| f4 | −10.0689 | −41.6162 | −14.4066 | −42.0661 | −27.1365 | −10.7355 | −10.2385 |
| f5 | 13.0969 | 19.9694 | 15.5285 | 20.6205 | 18.2111 | 15.6108 | 14.7848 |
| β2w | −0.1971 | −0.1881 | −0.2199 | −0.1860 | −0.1909 | −0.2114 | −0.2094 |
| β3w | −0.3783 | −0.5378 | −0.4251 | −0.5393 | −0.6042 | −0.4143 | −0.3799 |
| β4w | 2.1540 | 1.7172 | 2.2851 | 1.8607 | 2.2641 | 2.2350 | 2.1202 |
| β5w | 0.6039 | 0.4056 | 0.5326 | 0.3953 | 0.4172 | 0.6282 | 0.6537 |
| β2t | −0.6579 | −1.3403 | −0.9953 | −1.4462 | −1.7767 | −0.8846 | −0.7808 |
| β3t | −0.6845 | −1.4170 | −0.7554 | −1.1849 | −0.7897 | −0.6431 | −0.6123 |
| β4t | 2.7708 | 2.0806 | 2.1819 | 1.9947 | 2.2531 | 2.8529 | 2.8377 |
| β5t | 0.7604 | 0.3460 | 0.6793 | 0.4192 | 0.5744 | 0.7413 | 0.7967 |
| (|f4|/f5)/Z | 0.0786 | 0.1074 | 0.0947 | 0.1051 | 0.0894 | 0.0703 | 0.0706 |
| |f2|/ft | 0.1568 | 0.1057 | 0.1441 | 0.0986 | 0.0811 | 0.1319 | 0.1442 |
| (f5/|f2|)/Z | 0.2012 | 0.1048 | 0.2088 | 0.1077 | 0.1349 | 0.2402 | 0.2219 |
| (β3t/β3w)/Z | 0.1849 | 0.1358 | 0.1814 | 0.1132 | 0.0784 | 0.1586 | 0.1644 |
| (|β5t|/|β5w|)/Z | 0.1287 | 0.0440 | 0.1302 | 0.0546 | 0.0826 | 0.1206 | 0.1243 |

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-135687 filed May 23, 2008, which is hereby incorporated by reference herein in its entirety.

What is claimed is:

1. A zoom lens comprising:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein the first lens unit, the second lens unit, the third lens unit, the fourth lens unit, and the fifth lens unit are arranged in order from the object side to the image side,
wherein all of the lens units are moved during zooming from the wide-angle end to the telephoto end such that a distance between the first lens unit and the second lens unit is increased and a distance between the third lens unit and the fifth lens unit is increased,
wherein the following condition is satisfied:

$$0.01 \leq (|f4|/f5)/Z \leq 0.11$$

$$Z = ft/fw$$

where f4 is a focal length of the fourth lens unit, f5 is a focal length of the fifth lens unit, fw is a focal length of the entire system of the zoom lens at the wide-angle end, and ft is a focal length of the entire system of the zoom lens at the telephoto end, and wherein the following condition is satisfied:

$$0.07 \leq |f2|/ft \leq 0.15$$

where f2 is a focal length of the second lens unit.

2. The zoom lens according to claim 1, wherein the following condition is satisfied:

$$0.10 \leq (f5/|f2|)/Z \leq 0.25$$

where f2 is a focal length of the second lens unit.

3. The zoom lens according to claim 1, wherein the following condition is satisfied:

$$0.01 \leq (\beta 3t/\beta 3w)/Z \leq 0.20$$

where $\beta 3w$ and $\beta 3t$ are lateral magnifications of the third lens unit at the wide-angle end and the telephoto end, respectively.

4. The zoom lens according to claim 1, wherein the following condition is satisfied:

$$0.01 \leq (|\beta 5t|/|\beta 5w|)/Z \leq 0.14$$

where $\beta 5w$ and $\beta 5t$ are lateral magnifications of the fifth lens unit at the wide-angle end and the telephoto end, respectively.

5. The zoom lens according to claim 1, wherein an imaging position is changed by moving a part or the entire body of the third lens unit in a direction having a component that is perpendicular to an optical axis of the zoom lens.

6. The zoom lens according to claim 1, wherein the third lens unit includes one or more positive lenses including a positive lens disposed at a position closest to the object side and one or more negative lenses, and
wherein at least one of the positive lenses included in the third lens unit is an aspherical lens.

7. The zoom lens according to claim 1, wherein focusing is performed by moving the fourth lens unit or the fifth lens unit along an optical axis of the zoom lens.

8. An image pickup apparatus comprising:
the zoom lens according to claim 1; and
an image pickup element which receives an image formed by the zoom lens.

9. A zoom lens comprising:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein the first lens unit, the second lens unit, the third lens unit, the fourth lens unit, and the fifth lens unit are arranged in order from the object side to the image side,
wherein all of the lens units are moved during zooming from the wide-angle end to the telephoto end such that a distance between the first lens unit and the second lens unit is increased and a distance between the third lens unit and the fifth lens unit is increased,
wherein the following condition is satisfied:

$$0.06 \leq (|f4|/f5)/Z \leq 0.108$$

$$Z = ft/fw$$

where f4 is a focal length of the fourth lens unit, f5 is a focal length of the fifth lens unit, fw is a focal length of the entire system of the zoom lens at the wide-angle end, and ft is a focal length of the entire system of the zoom lens at the telephoto end, and wherein the following condition is satisfied:

$$0.07 \leq |f2|/ft \leq 0.15$$

where f2 is a focal length of the second lens unit.

10. The zoom lens according to claim 9, wherein the following condition is satisfied:

$$0.104 \leq (f5/|f2|)/Z \leq 0.241$$

where f2 is a focal length of the second lens unit.

11. The zoom lens according to claim 9, wherein the following condition is satisfied:

$$0.05 \leq (\beta 3t/\beta 3w)/Z \leq 0.19$$

where $\beta 3w$ and $\beta 3t$ are lateral magnifications of the third lens unit at the wide-angle end and the telephoto end, respectively.

12. The zoom lens according to claim 9, wherein the following condition is satisfied:

$$0.04 \leq (|\beta 5t|/|\beta 5w|)/Z \leq 0.131$$

where $\beta 5w$ and $\beta 5t$ are lateral magnifications of the fifth lens unit at the wide-angle end and the telephoto end, respectively.

13. The zoom lens according to claim 9, wherein an imaging position is changed by moving a part or the entire body of the third lens unit in a direction having a component that is perpendicular to an optical axis of the zoom lens.

14. The zoom lens according to claim 9, wherein the third lens unit includes one or more positive lenses including a positive lens disposed at a position closest to the object side and one or more negative lenses, and wherein at least one of the positive lenses included in the third lens unit is an aspherical lens.

15. The zoom lens according to claim 9, wherein focusing is performed by moving the fourth lens unit or the fifth lens unit along an optical axis of the zoom lens.

16. An image pickup apparatus comprising:

the zoom lens according to claim 9; and an image pickup element which receives an image formed by the zoom lens.

* * * * *